(12) United States Patent
Gardner et al.

(10) Patent No.: US 11,250,146 B2
(45) Date of Patent: Feb. 15, 2022

(54) LOGIC CIRCUITRY

(71) Applicant: Hewlett-Packard Development Company, L.P., Spring, TX (US)

(72) Inventors: James Michael Gardner, Corvallis, OR (US); Scott A. Linn, Corvallis, OR (US); Stephen D. Panshin, Corvallis, OR (US); Jefferson P. Ward, Vancouver, WA (US); David Owen Roethig, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 318 days.

(21) Appl. No.: 16/495,227

(22) PCT Filed: Dec. 3, 2018

(86) PCT No.: PCT/US2018/063638
§ 371 (c)(1),
(2) Date: Sep. 18, 2019

(87) PCT Pub. No.: WO2020/117197
PCT Pub. Date: Jun. 11, 2020

(65) Prior Publication Data
US 2021/0334391 A1 Oct. 28, 2021

(51) Int. Cl.
*G06F 21/60* (2013.01)
*B41J 2/175* (2006.01)
(Continued)

(52) U.S. Cl.
CPC ........ *G06F 21/608* (2013.01); *B41J 2/17546* (2013.01); *G06F 13/4282* (2013.01); *G06F 21/44* (2013.01); *G06F 2213/0016* (2013.01)

(58) Field of Classification Search
CPC ......... B41J 2/17546; B41J 2002/17516; B41J 2002/17579; B41J 2002/17586;
(Continued)

(56) References Cited

U.S. PATENT DOCUMENTS

| 4,074,284 A | 2/1978 | Dexter et al. |
| 4,506,276 A | 3/1985 | Kyser et al. |

(Continued)

FOREIGN PATENT DOCUMENTS

| AU | 2014202104 A1 | 5/2014 |
| CA | 2507422 A1 | 1/2002 |

(Continued)

OTHER PUBLICATIONS

Open Source Multi-head 3D printer for polymer metal composite component manufacturing.
(Continued)

*Primary Examiner* — Negussie Worku
(74) *Attorney, Agent, or Firm* — Hanley Flight & Zimmerman LLC

(57) ABSTRACT

In an example, a method comprises, by logic circuitry associated with a replaceable print apparatus component, responding to a first validation request sent via an I2C bus to a first address associated with the logic circuitry with a first validation response; and responding to a second validation request sent via the I2C bus to a second address associated with the logic circuitry with a second validation response.

29 Claims, 11 Drawing Sheets

(51) Int. Cl.
*G06F 13/42* (2006.01)
*G06F 21/44* (2013.01)

(58) Field of Classification Search
CPC .... B41J 29/393; B41J 2/17513; B41J 2/1752;
B41J 2/17523; B41J 2/17526; B41J
2/1753; B41J 2/17553; B41J 2/17556;
B41J 2/17559; B41J 2/17566; G06K
15/4075; G06K 15/102; B33Y 50/00;
G01L 23/08; G03G 15/0856; G05B
2219/49023; G06F 21/608; G06F
13/4282; G06F 21/44; G06F 2213/0016;
G06F 13/42; G06F 21/60; G06F 2213/40;
H04N 1/00
USPC ....................................................... 358/1.015
See application file for complete search history.

(56) References Cited

U.S. PATENT DOCUMENTS

| | | |
|---|---|---|
| 4,639,738 A | 1/1987 | Young et al. |
| 4,734,787 A | 3/1988 | Hayashi |
| 5,001,596 A | 3/1991 | Hart |
| 5,045,811 A | 9/1991 | Lewis |
| 5,079,570 A | 1/1992 | Mohr et al. |
| 5,142,909 A | 9/1992 | Baughman |
| 5,329,254 A | 7/1994 | Takano |
| 5,438,351 A | 8/1995 | Trenchard et al. |
| 5,471,176 A | 11/1995 | James et al. |
| 5,583,544 A | 12/1996 | Stamer et al. |
| 5,680,960 A | 10/1997 | Keyes et al. |
| 5,682,184 A | 10/1997 | Stephany et al. |
| 5,699,091 A | 12/1997 | Bullock et al. |
| 5,731,824 A | 3/1998 | Kneezel et al. |
| 5,751,323 A | 5/1998 | Swanson |
| 5,757,406 A | 5/1998 | Kaplinsky et al. |
| 5,777,646 A | 7/1998 | Barinaga et al. |
| 5,788,388 A | 8/1998 | Cowger et al. |
| 5,861,780 A | 1/1999 | Fukuda |
| 5,975,688 A | 11/1999 | Kanaya et al. |
| 6,068,363 A | 5/2000 | Saito |
| 6,098,457 A | 8/2000 | Poole |
| 6,151,039 A | 11/2000 | Hmelar et al. |
| 6,164,766 A | 12/2000 | Erickson |
| 6,175,929 B1 | 1/2001 | Hsu et al. |
| 6,219,933 B1 | 4/2001 | Taniguchi et al. |
| 6,299,273 B1 | 10/2001 | Anderson et al. |
| 6,312,074 B1 | 11/2001 | Walker |
| 6,341,853 B1 | 1/2002 | Scheffelin et al. |
| 6,386,693 B1 | 5/2002 | Michele |
| 6,402,299 B1 | 6/2002 | DeMeerleer |
| 6,412,901 B2 | 7/2002 | Su et al. |
| 6,431,670 B1 | 8/2002 | Schantz et al. |
| 6,456,802 B1 | 9/2002 | Phillips |
| 6,457,355 B1 | 10/2002 | Philipp |
| 6,494,553 B1 | 12/2002 | Donahue et al. |
| 6,494,568 B2 | 12/2002 | Hou et al. |
| 6,598,963 B1 | 7/2003 | Yamamoto et al. |
| 6,641,240 B2 | 11/2003 | Hsu et al. |
| 6,641,243 B2 | 11/2003 | Anderson et al. |
| 6,648,434 B2 | 11/2003 | Walker et al. |
| 6,685,290 B1 | 2/2004 | Farr et al. |
| 6,736,497 B2 | 5/2004 | Jung |
| 6,796,644 B1 | 9/2004 | Anderson, Jr. et al. |
| 6,802,581 B2 | 10/2004 | Hasseler et al. |
| 6,802,602 B2 | 10/2004 | Sakai et al. |
| 6,811,250 B2 | 11/2004 | Buchanan et al. |
| 6,902,256 B2 | 6/2005 | Anderson et al. |
| 6,908,179 B2 | 6/2005 | Pan et al. |
| 6,959,599 B2 | 11/2005 | Feldstein et al. |
| 6,966,222 B2 | 11/2005 | Carson et al. |
| 6,969,137 B2 | 11/2005 | Maeda |
| 7,039,734 B2 | 5/2006 | Sun et al. |
| 7,077,506 B2 | 7/2006 | Chen |
| 7,171,323 B2 | 1/2007 | Shipton et al. |
| 7,240,130 B2 | 7/2007 | Larson |
| 7,260,662 B2 | 8/2007 | Moriwaki et al. |
| 7,328,115 B2 | 2/2008 | Shipton et al. |
| 7,380,042 B2 | 5/2008 | Wang et al. |
| 7,458,656 B2 | 12/2008 | Smith |
| 7,533,960 B2 | 5/2009 | Yasuda et al. |
| 7,547,082 B2 | 6/2009 | Lee et al. |
| 7,630,304 B2 | 12/2009 | Larson et al. |
| 7,686,423 B2 | 3/2010 | Sato et al. |
| 7,740,347 B2 | 6/2010 | Silverbrook et al. |
| 7,775,638 B2 | 8/2010 | Hirosawa et al. |
| 7,841,712 B2 | 11/2010 | Muyskens et al. |
| 7,886,197 B2 | 2/2011 | Wegman |
| 7,890,690 B2 | 2/2011 | Naderi et al. |
| 7,970,042 B2 | 6/2011 | Hardin et al. |
| 8,040,215 B2 | 10/2011 | Zakriti |
| 8,161,224 B2 | 4/2012 | Laurencin et al. |
| 8,215,018 B2 | 7/2012 | Morita et al. |
| 8,220,910 B2 | 7/2012 | Wanibe |
| 8,224,602 B2 | 7/2012 | Lory et al. |
| 8,289,788 B2 | 10/2012 | Asauchi |
| 8,331,581 B2 | 12/2012 | Pennock |
| 8,348,377 B2 | 1/2013 | Asauchi |
| 8,350,628 B1 | 1/2013 | George et al. |
| 8,364,859 B2 | 1/2013 | Sato |
| 8,386,657 B2 | 2/2013 | Adkins et al. |
| 8,393,718 B2 | 3/2013 | Kida et al. |
| 8,393,721 B2 | 3/2013 | Katoh et al. |
| 8,429,437 B2 | 4/2013 | Asauchi |
| 8,432,421 B2 | 4/2013 | Muraki et al. |
| 8,438,919 B2 | 5/2013 | Phillips et al. |
| 8,454,137 B2 | 6/2013 | Price et al. |
| 8,556,394 B2 | 10/2013 | Chen |
| 8,558,577 B1 | 10/2013 | Soriano Fosas et al. |
| 8,562,091 B2 | 10/2013 | Sabanovic et al. |
| 8,591,012 B2 | 11/2013 | Yoshino et al. |
| 8,608,276 B2 | 12/2013 | Oohashi et al. |
| 8,621,116 B2 | 12/2013 | Fister et al. |
| 8,651,614 B2 * | 2/2014 | Sakamoto ............ B41J 11/007 347/19 |
| 8,651,643 B2 | 2/2014 | Harvey et al. |
| 8,721,059 B2 | 5/2014 | Kodama et al. |
| 8,721,203 B2 | 5/2014 | Ehrhardt, Jr. |
| 8,752,943 B2 | 6/2014 | Hirano et al. |
| 8,864,277 B2 | 10/2014 | Rice et al. |
| 8,876,257 B2 | 11/2014 | Harada et al. |
| 8,888,207 B2 * | 11/2014 | Furness, III ......... B41J 2/17546 347/6 |
| 8,892,798 B2 | 11/2014 | Tailliet et al. |
| 8,898,358 B2 | 11/2014 | DeCesaris et al. |
| 8,978,487 B2 | 3/2015 | Fergusson et al. |
| 8,990,467 B2 | 3/2015 | Saito |
| 9,079,414 B2 | 7/2015 | Lester et al. |
| 9,108,448 B1 | 8/2015 | Bergstedt |
| 9,132,656 B2 | 9/2015 | Nicholson, III et al. |
| 9,137,093 B1 | 9/2015 | Abraham et al. |
| 9,176,921 B2 | 11/2015 | Fister et al. |
| 9,213,396 B1 | 12/2015 | Booth et al. |
| 9,213,927 B1 | 12/2015 | Ahne |
| 9,254,661 B2 | 2/2016 | Otaka et al. |
| 9,298,908 B1 * | 3/2016 | Booth ................ G06F 13/4068 |
| 9,370,934 B2 | 6/2016 | Asauchi et al. |
| 9,400,204 B2 | 7/2016 | Schoenberg |
| 9,413,356 B1 | 8/2016 | McKinley |
| 9,413,359 B2 | 8/2016 | Stirk |
| 9,454,504 B2 | 9/2016 | Evans |
| 9,483,003 B2 | 11/2016 | Thacker, III |
| 9,487,017 B2 | 11/2016 | Ge et al. |
| 9,496,884 B1 | 11/2016 | Azenkot et al. |
| 9,511,596 B2 | 12/2016 | Anderson et al. |
| 9,561,662 B2 | 2/2017 | Ward et al. |
| 9,582,443 B1 | 2/2017 | Switzer et al. |
| 9,599,500 B2 | 3/2017 | Ge et al. |
| 9,619,663 B2 | 4/2017 | Refstrup |
| 9,671,820 B2 | 6/2017 | Maruyama et al. |
| 9,734,121 B2 | 8/2017 | Pitigoi-Aron et al. |
| 9,738,087 B2 | 8/2017 | Kato et al. |
| 9,746,799 B2 | 8/2017 | Jeran |

(56) References Cited

U.S. PATENT DOCUMENTS

| | | |
|---|---|---|
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo Navarro et al. |
| 10,031,882 B2 | 7/2018 | Srivastava et al. |
| 10,052,878 B2 | 8/2018 | Benneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade et al. |
| 10,338,838 B2 | 7/2019 | Olarig |
| 10,471,725 B2 | 11/2019 | Esterberg et al. |
| 10,875,318 B1 * | 12/2020 | Gardner ............... B41J 2/1753 |
| 10,894,423 B2 | 1/2021 | Gardner et al. |
| 11,034,157 B2 | 6/2021 | Gardner et al. |
| 2001/0029554 A1 | 10/2001 | Namba |
| 2001/0033316 A1 | 10/2001 | Eida |
| 2002/0012016 A1 | 1/2002 | Wilson et al. |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler |
| 2004/0036733 A1 | 2/2004 | Kubota et al. |
| 2004/0085382 A1 | 5/2004 | Kosugi et al. |
| 2004/0155913 A1 | 8/2004 | Kosugi et al. |
| 2004/0252146 A1 | 12/2004 | Naka et al. |
| 2005/0010910 A1 | 1/2005 | Lindhorst et al. |
| 2005/0093910 A1 | 5/2005 | Im |
| 2005/0125105 A1 | 6/2005 | Halstead et al. |
| 2005/0126282 A1 | 6/2005 | Maatuk |
| 2005/0185595 A1 | 8/2005 | Lee |
| 2005/0229699 A1 | 10/2005 | Chai et al. |
| 2006/0007253 A1 | 1/2006 | Kosugi |
| 2006/0007295 A1 | 1/2006 | Ueda |
| 2006/0072952 A1 | 4/2006 | Plunkett et al. |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong et al. |
| 2007/0024650 A1 | 2/2007 | Reinten et al. |
| 2007/0068249 A1 | 3/2007 | Eguchi et al. |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan et al. |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Cheung et al. |
| 2008/0165232 A1 | 7/2008 | Yuen |
| 2008/0192074 A1 | 8/2008 | Dubois et al. |
| 2008/0211838 A1 | 9/2008 | Zhang |
| 2008/0246626 A1 | 10/2008 | Sheafor et al. |
| 2008/0298455 A1 | 12/2008 | Ilia et al. |
| 2008/0307134 A1 | 12/2008 | Geissler et al. |
| 2009/0013779 A1 | 1/2009 | Usui |
| 2009/0021766 A1 | 1/2009 | Yamazaki |
| 2009/0177823 A1 | 7/2009 | Chao |
| 2009/0179678 A1 | 7/2009 | Hardin |
| 2009/0290005 A1 | 11/2009 | Wanibe |
| 2009/0309941 A1 | 12/2009 | Price et al. |
| 2010/0082271 A1 | 4/2010 | McCann et al. |
| 2010/0138745 A1 | 6/2010 | McNamara et al. |
| 2010/0205350 A1 | 8/2010 | Bryant-Rich |
| 2010/0220128 A1 | 9/2010 | Zaba et al. |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan et al. |
| 2012/0284429 A1 | 11/2012 | Adkins et al. |
| 2012/0299989 A1 | 11/2012 | Prothon et al. |
| 2013/0018513 A1 | 1/2013 | Metselaar |
| 2013/0054933 A1 | 2/2013 | Fister |
| 2013/0067016 A1 | 3/2013 | Adkins |
| 2013/0155142 A1 | 6/2013 | Browning et al. |
| 2013/0250024 A1 | 9/2013 | Kakishima |
| 2013/0295245 A1 | 11/2013 | Gardner |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Hall et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin et al. |
| 2014/0372652 A1 | 12/2014 | Shu |
| 2014/0375321 A1 | 12/2014 | Ikeya |
| 2014/0375730 A1 | 12/2014 | Campbell-Brown et al. |
| 2015/0028671 A1 | 1/2015 | Ragaini et al. |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth et al. |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell et al. |
| 2017/0100941 A1 | 4/2017 | Kuribayashi |
| 2017/0144448 A1 | 5/2017 | Smith |
| 2017/0157929 A1 | 6/2017 | Yokoo et al. |
| 2017/0168976 A1 | 6/2017 | Yost et al. |
| 2017/0169623 A1 | 6/2017 | Chen et al. |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi et al. |
| 2018/0050537 A1 | 2/2018 | Bakker et al. |
| 2018/0100753 A1 | 4/2018 | Cumbie et al. |
| 2018/0143935 A1 | 5/2018 | Cox |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade et al. |

(56) References Cited

U.S. PATENT DOCUMENTS

| | | | |
|---|---|---|---|
| 2018/0281438 A1 | 10/2018 | Horade et al. |
| 2018/0290457 A1 | 10/2018 | Ge et al. |
| 2018/0302110 A1 | 10/2018 | Solan |
| 2018/0304640 A1 | 10/2018 | Horne |
| 2019/0004991 A1 | 1/2019 | Foust et al. |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson et al. |
| 2019/0118527 A1 | 4/2019 | Anderson et al. |
| 2019/0126631 A1 | 5/2019 | Anderson et al. |
| 2019/0137316 A1 | 5/2019 | Anderson et al. |
| 2019/0138484 A1 | 5/2019 | De Santiago Dominguez et al. |
| 2019/0217628 A1 | 7/2019 | Horade et al. |
| 2019/0226930 A1 | 7/2019 | Cumbie et al. |
| 2019/0240985 A1 | 8/2019 | Ge et al. |
| 2020/0159689 A1 | 5/2020 | Koshisaka et al. |
| 2021/0334392 A1 | 10/2021 | Panshin et al. |

FOREIGN PATENT DOCUMENTS

| | | | |
|---|---|---|---|
| CN | 2603934 | | 2/2004 |
| CN | 2734479 | | 10/2005 |
| CN | 201761148 | | 3/2011 |
| CN | 102231054 | | 11/2011 |
| CN | 203651218 | | 6/2014 |
| CN | 102736627 | | 12/2014 |
| CN | 103879149 | B | 6/2015 |
| CN | 105760318 | | 7/2016 |
| CN | 107209743 | | 9/2017 |
| CN | 108819486 | | 11/2018 |
| CN | 209014461 | U | 6/2019 |
| DE | 3712699 | C2 | 3/1989 |
| EP | 0015954 | A1 | 6/1984 |
| EP | 0720916 | | 7/1996 |
| EP | 0994779 | | 4/2000 |
| EP | 1164022 | | 12/2001 |
| EP | 1238811 | | 9/2002 |
| EP | 1285764 | | 2/2003 |
| EP | 1314565 | A2 | 5/2003 |
| EP | 1389531 | | 2/2004 |
| EP | 1800872 | | 6/2007 |
| EP | 1524120 | B1 | 9/2008 |
| EP | 2237163 | | 10/2010 |
| EP | 1839872 | B1 | 11/2010 |
| EP | 2385468 | | 11/2011 |
| EP | 2854063 | | 4/2014 |
| EP | 3208736 | | 8/2017 |
| GB | 2519181 | | 4/2015 |
| JP | H04220353 | | 8/1992 |
| JP | 2001292133 | | 10/2001 |
| JP | 2002026471 | A | 1/2002 |
| JP | 2003326726 | | 11/2003 |
| JP | 2005262458 | A | 9/2005 |
| JP | 2009258604 | | 11/2009 |
| JP | 2010079199 | | 4/2010 |
| JP | 2011113336 | | 6/2011 |
| JP | 2012063770 | | 3/2012 |
| JP | 2013197677 | | 9/2013 |
| JP | 5644052 | B2 | 12/2014 |
| JP | 2014534917 | | 12/2014 |
| JP | 2016185664 | | 10/2016 |
| JP | 2017196842 | | 11/2017 |
| JP | 2018049141 | | 3/2018 |
| JP | 2018136774 | | 8/2018 |
| JP | 2018161785 | | 10/2018 |
| JP | 2018531394 | | 10/2018 |
| KR | 20080003539 | A | 1/2008 |
| KR | 101785051 | | 10/2017 |
| TW | 200707209 | | 2/2007 |
| TW | 201202948 | | 1/2012 |
| TW | 201546620 | A | 12/2015 |
| WO | 2007107957 | | 9/2007 |
| WO | WO-2008117194 | A1 | 10/2008 |
| WO | WO-2009145774 | A1 | 12/2009 |
| WO | WO-2012020443 | | 2/2012 |
| WO | WO-2012054050 | | 4/2012 |
| WO | WO-2012057755 | A1 | 5/2012 |
| WO | 2013048430 | | 4/2013 |
| WO | WO-2015116092 | | 8/2015 |
| WO | WO-2016061480 | | 4/2016 |
| WO | 2016114759 | | 7/2016 |
| WO | 2016130157 | | 8/2016 |
| WO | 2017074342 | | 5/2017 |
| WO | WO-2017074334 | A1 | 5/2017 |
| WO | 2017174363 | | 10/2017 |
| WO | WO-2017184147 | A1 | 10/2017 |
| WO | 2017189009 | | 11/2017 |
| WO | 2017189010 | | 11/2017 |
| WO | 2017189011 | | 11/2017 |
| WO | 2017189013 | | 11/2017 |
| WO | 2017194913 | | 11/2017 |
| WO | WO-2017189009 | | 11/2017 |
| WO | WO-2017189010 | A1 | 11/2017 |
| WO | WO-2017189011 | A1 | 11/2017 |
| WO | 2018017066 | | 1/2018 |
| WO | WO-2018017066 | A1 | 1/2018 |
| WO | WO-2018022038 | | 2/2018 |
| WO | WO-2018186847 | A1 | 10/2018 |
| WO | 2018199886 | | 11/2018 |
| WO | 2018199891 | | 11/2018 |
| WO | WO-2018199891 | A1 | 11/2018 |
| WO | WO-2018199895 | | 11/2018 |
| WO | WO-2018217185 | A1 | 11/2018 |
| WO | WO-2019017963 | A1 | 1/2019 |
| WO | 2019078835 | | 4/2019 |
| WO | 2019078839 | | 4/2019 |
| WO | 2019078840 | | 4/2019 |
| WO | 2019078843 | | 4/2019 |
| WO | 2019078844 | | 4/2019 |
| WO | 2019078845 | | 4/2019 |
| WO | WO-2019078834 | A1 | 4/2019 |

OTHER PUBLICATIONS

PCA954x I2C-bus multiplexer, Jul. 2008, NXP Semiconductors.
PCA9641 I2C arbiter, Oct. 2014, NXP Semiconductors.
Epson, "Epson provides the best inks for the job," retrieved from https://www.epson.co.nz/microsite/excellence/inks_why.asp, ast retrieved on Jul. 1, 2019, 3 pages.
International Searching Authority "International Search Report and Written Opinion" issued in connection with PCT/US2018/063631 dated Aug. 23, 2019, 13 pages.
NXP Semiconductors N. V. "PCA9641: 2-channel I2C-bus master arbiter Product data Sheet" released Oct. 23, 2014, 77 pages.
NXP Semiconductors N.V. "Nxp 2-, 4-, and 8-channel I2C/SMBus muxes and switches PCA954x" released Apr. 1, 2014, 34 pages.
Maxim Integrated Products "1-to-8 I2C Bus Switches/Multiplexers with Bus Lock-Up Detection, Isolation, and Notification" dated Sep. 2008, 22 pages.
International Searching Authority "International Search Report and Written Opinion" issued in connection with PCT/US2019/017511 dated Dec. 3, 2018, 12 pages.
International Searching Authority "International Search Report and Written Opinion" issued in connection with PCT/US2018/063624 dated Aug. 23, 2019, 13 pages.
International Searching Authority "International Search Report and Written Opinion" issued in connection with PCT/US2018/063630 dated Aug. 22, 2019, 15 pages.
International Searching Authority "International Search Report and Written Opinion" issued in connection with PCT/US2019/026159 dated Aug. 15, 2019, 15 pages.
International Searching Authority "International Search Report and Written Opinion" issued in connection with PCT/US2019/026161 dated Aug. 23, 2019, 20 pages.

(56) References Cited

OTHER PUBLICATIONS

International Searching Authority "International Search Report and Written Opinion" issued in connection with PCT/US2018/063643 dated Aug. 20, 2019, 13 pages.
International Searching Authority "International Search Report and Written Opinion" issued in connection with PCT/US2019/026145 dated Sep. 5, 2019, 16 pages.
International Searching Authority "International Search Report and Written Opinion" issued in connection with PCT/US2019/026154 dated Sep. 5, 2019, 16 pages.
International Searching Authority "International Search Report and Written Opinion" issued in connection with PCT/US2019/026124 dated Aug. 26, 2019, 15 pages.
International Searching Authority "International Search Report and Written Opinion" issued in connection with PCT/US2019/026133 dated Aug. 26, 2019, 18 pages.
International Searching Authority "International Search Report and Written Opinion" issued in connection with PCT/US2018/063633 dated Jul. 23, 2019, 12 pages.
The I2C-Bus Specification Version 2.1 Jan. 2000 (Year: 2000), 46 pages.
United States Patent and Trademark Office, "Non-Final Office action," issued in connection with U.S. Appl. No. 16/460,016, dated Sep. 12, 2019, 12 pages.
United States Patent and Trademark Office, "Restriction Requirement," issued in connection with U.S. Appl. No. 16/502,479, dated Aug. 15, 2019, 7 pages.
United States Patent and Trademark Office, "Non-Final office action," issued in connection with U.S. Appl. No. 16/502,479, dated Dec. 11, 2019, 13 pages.
United States Patent and Trademark Office, "Notice of Allowance ," issued in connection with U.S. Appl. No. 16/502,479, dated Apr. 9, 2020, 9 pages.
United States Patent and Trademark Office, "Notice of allowance," issued in connection with U.S. Appl. No. 16/460,016, dated Mar. 25, 2020, 10 pages.
United States Patent and Trademark Office, "Notice of Allowance," issued in connection with U.S. Appl. No. 16/728,207, dated Feb. 19, 2020 19 pages.
HP, "Development of the HP DeskJet 1200C Print Cartridge Platform", Feb. 1994, 9 pages.
Reddit, "Use an accelerometer to measure Z wobble", last retrieved on Jul. 1, 2019, https://www.reddit.com/r/Reprap/comments/6qsoyd/use_an_accelerometer_to_measure_z_wobble/, 3 pages.
Arnostech, "Thermal Inkjet Printers," retrieved from http://www.arnostech.com/machines/coding-systems/thermal-inkjet-printers/, last retrieved on Jul. 1, 2019, 3 pages.
NXP "Introducing A10006 Secure Authenticator Tamper-Resistant Anti Counterfeit Solution", last retrieved on Jul. 3, 2019, 29 pages.
United States Patent and Trademark Office, "Non-Final Office action," issued in connection with U.S. Appl. No. 16/505,090, dated Sep. 10, 2019, 20 pages.
United States Patent and Trademark Office, "Notice of Allowance," issued in connection with U.S. Appl. No. 16/505,090, dated Feb. 12, 2020, 9 pages.
United States Patent and Trademark Office, "Notice of Allowance," issued in connection with U.S. Appl. No. 16/505,090, dated Oct. 22, 2019, 5 pages.
International Searching Authority "International Search Report and Written Opinion" issued in connection with PCT/US2018/063638 dated Aug. 26, 2019, 13 pages.

\* cited by examiner

LOGIC CIRCUITRY

RELATED APPLICATION

This patent arises from the U.S. national stage of International Patent Application Serial No. PCT/US2018/063638, having an international filing date of Dec. 3, 2018, which is hereby incorporated by reference in its entirety for all purposes.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analogue communications may be used.

Some 2D and 3D printing systems include one or more replaceable print apparatus components, such as print material containers (e.g. inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

BRIEF DESCRIPTION OF DRAWINGS

Non-limiting examples will now be described with reference to the accompanying drawings, in which.

DETAILED DESCRIPTION

Figure 1:
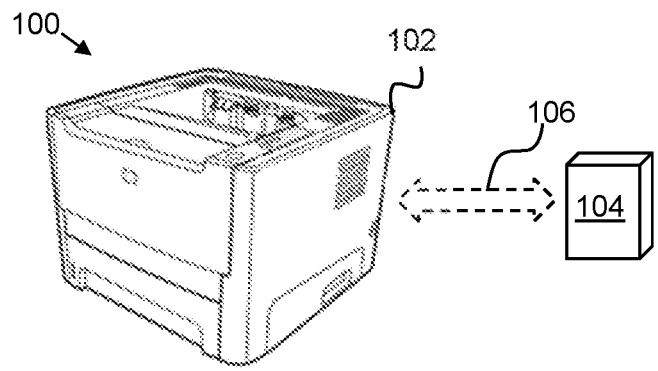
FIG. 1 is an example of a printing system.

Some examples of applications described herein in the context of print apparatus. However, not all the examples are limited to such applications, and at least some of the principles set out herein may be used in other contexts.

The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above x may indicate a logic "1" whereas a voltage value below x volts may indicate a logic "0", where x is a predetermined numerical value. By generating an appropriate voltage in each of a series of clock periods, data can be communicated via a bus or another communication link.

Certain example print material containers have slave logic that utilize I2C communications, although in other examples, other forms of digital or analogue communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may comprise a processor to perform data operations before responding to requests from logic circuitry of the print system.

Communications between print apparatus and replaceable print apparatus components installed in the apparatus (and/or the respective logic circuitry thereof) may facilitate various functions.

Logic circuitry within a print apparatus may receive information from logic circuitry associated with a replaceable print apparatus component via a communications interface, and/or may send commands to the replaceable print apparatus component logic circuitry, which may comprise commands to write data to a memory associated therewith, or to read data therefrom.

This disclosure may refer to print apparatus components, which may include replaceable print apparatus components. Certain print apparatus components may include a reservoir holding print agent or print material. In this disclosure print material and print agent mean the same thing and are intended to encompass different example print materials including ink, toner particles, liquid toner, three-dimensional printing agents (including stimulators and inhibitors), three-dimensional printing build material, three-dimensional print powder.

For example, the identity, functionality and/or status of a replaceable print apparatus component and/or the logic circuitry associated therewith may be communicated to logic circuitry of a print apparatus via a communications interface. For example, a print agent container logic circuit may be configured to communicate an identity. For example, the identity may be stored on the logic circuit to facilitate the checking thereof by a compatible print apparatus logic circuit, wherein in different examples the identity may be in the form of a product serial number, another cartridge number, a brand name, a signature or bit indicating an authenticity, etc. In certain examples of this disclosure, multiple functions or logic circuits may be associated with a single logic circuit package of a single print apparatus component whereby multiple corresponding identities may be stored on and/or read from the logic circuit package. For example, the logic circuitry of the print apparatus component may store print apparatus component characteristics data, for example comprising data representative of at least one characteristic of a print material container, for example print material identifying characteristics, such as, total volume, initial fill volume and/or fill proportion (see for example EP patent publication No. 0941856, incorporated herein by reference); color such as cyan, magenta, yellow or black; color data including compressed or non-compressed color maps or portions thereof (see for example international patent application publication No. WO2015/016860, incorporated herein by reference); data to reconstruct colour maps such as recipes (see for example international patent application publication No. WO2016/028272, incorporated herein by reference); etc. For example, the print material characteristics may be configured to enhance a functionality or output with respect to a print apparatus in which it is installed. In a further example, a status, such as print material level-related data (e.g. a fill level) or other sensed (e.g. dynamic) property, may be provided via a communications interface, for example such that a print apparatus may generate an indication of the fill level to a user. In some examples, a validation process may be carried out by a print apparatus. An example of a cryptographically authenticated communication scheme is explained in US patent publication 9619663 (incorporated herein by reference). For example, the print apparatus may verify that a print agent container originates from an authorized source, so as to ensure the quality thereof (for example, performing an authentication thereof). Examples of logic circuits of replaceable components that are configured to respond to authentication requests are US patent publication No. 9619663 (incorporated herein by reference), US patent publication No. 9561662 (incorporated herein by reference), and/or US patent publication No. 9893893 (incorporated herein by reference).

In certain examples of this disclosure, a validation process may include an integrity check to ensure that the replaceable print apparatus component and/or the logic circuitry associated therewith is functioning as expected, for example that communicated identity or identities, print material characteristics and status are as expected. The validation process may further comprise requesting sensor information such that logic circuitry of a print apparatus component can check that this sensor data complies with expected parameters.

Examples of sensors and sensor arrays are disclosed in prior international patent application publications WO2017/074342 (incorporated herein by reference), WO2017/184147 (incorporated herein by reference), and WO2018/022038 (incorporated herein by reference). These or other sensor types, or other arrangements that simulate signal outputs similar to these sensor arrays, could be used in accordance with this disclosure.

In turn, instructions to perform tasks may be sent to logic circuitry of a print apparatus component from logic circuitry associated with a print apparatus via the communications interface.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples the package may be directly affixed to a cartridge wall. In some examples, the package may comprise an interface, for example comprising pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g. a print apparatus). A first type of request may comprise a request for data, for example identification and/or authentication information. A second type of request from a host may be a request to perform a physical action, such as performing at least one measurement. A third type of request may be a request for a data processing action. There may be additional types or requests.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. In other examples, other forms of digital and/or analogue communication can be used.

FIG. 1 is an example of a printing system 100. The printing system 100 comprises a print apparatus 102 in communication with logic circuitry associated with a replaceable print apparatus component 104 via a communications link 106. Although for clarity, the replaceable print apparatus component 104 is shown as external to the print apparatus 102, in some examples, the replaceable print apparatus component 104 may be housed within the print apparatus. While a particular type of 2D print apparatus 102 is shown, a different type of 2D print apparatus or a 3D print apparatus may instead be provided.

The replaceable print apparatus component 104 may comprise, for example a print material container or cartridge (which, again, could be a build material container for 3D printing, a liquid or dry toner container for 2D printing, or a liquid print agent container for 2D or 3D printing), which may in some examples comprise a print head or other dispensing or transfer component. The replaceable print apparatus component 104 may for example contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example comprising print agent containers of different colors, print heads (which may be integral to the containers), or the like. In other examples the print apparatus components 104 could comprise service components, for example to be replaced by service personnel, examples of which could include print heads, toner process cartridges or logic circuit package by itself to adhere to corresponding print apparatus component and communicate to a compatible print apparatus logic circuit.

In some examples, the communications link 106 may comprise an I2C capable or compatible bus (herein after, an I2C bus).

Figure 2:
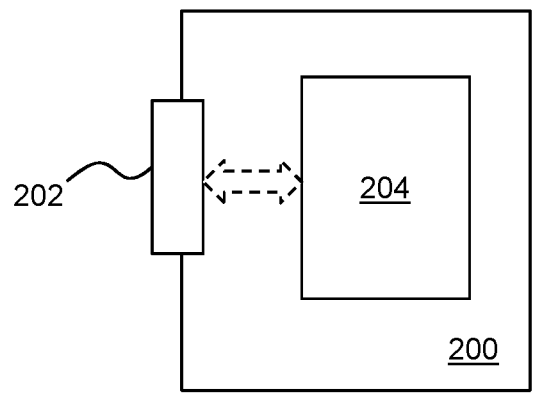
FIG. 2 is an example of a replaceable print apparatus component.

FIG. 2 shows an example of a replaceable print apparatus component 200, which may provide the replaceable print apparatus component 104 of FIG. 1. The replaceable print apparatus component 200 comprises a data interface 202 and a logic circuitry package 204. In use of the replaceable print apparatus component 200, the logic circuitry package 204 decodes data received via the data interface 202. The logic circuitry may perform other functions as set out below. The data interface 202 may comprise an I2C or other interface. In certain examples the data interface 202 may be part of the same package as the logic circuitry package 204.

In some examples, the logic circuitry package 204 may be further configured to encode data for transmission via the data interface 202. In some examples, there may be more than one data interface 202 provided.

In some examples, the logic circuitry package 204 may be arranged to act as a 'slave' in I2C communications.

Figure 3:
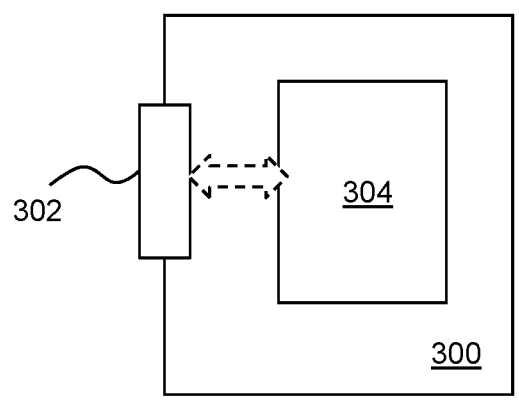
FIG. 3 shows an example of a print apparatus.

FIG. 3 shows an example of a print apparatus 300. The print apparatus 300 may provide the print apparatus 102 of FIG. 1. The print apparatus 300 may serve as a host for replaceable components. The print apparatus 300 comprises an interface 302 for communicating with a replaceable print apparatus component and a controller 304. The controller 304 comprises logic circuitry. In some examples, the interface 302 is an I2C interface.

In some examples, controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analogue communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
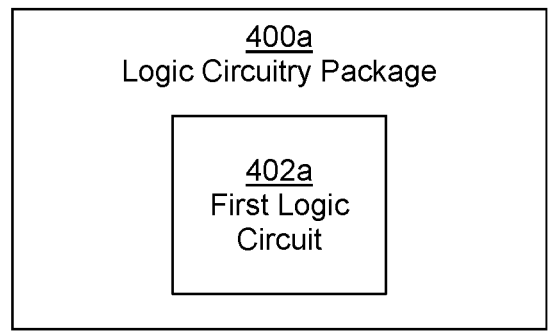
FIGS. 4A, 4B, 4C, 4D and 4E show examples of logic circuitry packages and processing circuitry.

FIG. 4A shows an example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and comprises a first logic circuit 402a, wherein the first address is an I2C address for the first logic circuit 402a. In some examples, the first address may be configurable. In other examples, the first address is a fixed address, e.g. "hard-wired", intended to remain the same address during the lifetime of the first logic circuit 402a. The first address may be associated with the logic circuitry package 400a at and during the connection with the print apparatus logic circuit, outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C address for logic circuitry packages 400a or replaceable print components.

In some examples, the logic circuitry package 400a is also addressable via a second address. For example, the second address may be associated with different logic functions or, at least partially, with different data than the first address. In some examples, the second address may be associated with a different hardware logic circuit or a different virtual device than the first address.

In some examples, the second address may be configurable. The second address may be an initial and/or default second address at the start of a communication session via the second address and may be reconfigured to a different address after the start of the session. In some examples, the second address may be used for the duration of the communication session, the logic circuitry package 400a may be configured to set the address to a default or initial address at the end of the session, or at or before the beginning of a new session. Communications in such a communication session may be directed to the second address and between communication sessions may be directed to the first address, whereby the print apparatus logic circuit 304 may verify, for example, different identities, characteristics and/or status through these different communication sessions via different addresses. In examples where the end of a communication session via the second address is associated with a loss of power to at least part of the logic circuit as is further set out below, this loss of power may cause the second 'temporary' address to be discarded (for example, the second address may be held in volatile memory, whereas the initial or default address may be held in persistent memory). Therefore a 'new' or 'temporary' second address may be set each time after the corresponding communications session is started (although in some cases the 'new' or 'temporary' second address may have been previously used in relation to the logic circuitry).

In other examples the logic circuit package 400a may not set itself back to the initial second address for starting each corresponding communication session. Rather, it may allow for configuring the second address at each corresponding communication session, without switching to the initial or default second address.

In other words, the second address may be configured to be an initial second address at the start of a time period during which the communication session is to take place. The logic circuitry package 400a may be configured to reconfigure its second address to a temporary address in response to a command sent to the initial second address and including that temporary address during that time period. The logic circuitry package 400a may then be effectively reset such that upon receiving a subsequent command indicative of the task and time period sent to the first address, the logic circuitry package 400a is configured to have the same initial second address.

In some examples, the initial and/or default second address of different logic circuitry packages 204, 400a, for example associated with different print material types (such as different colours or agents) and compatible with the same print apparatus logic circuit 304, may be the same. However, for each communication session with the second address, each logic circuitry package 400a may be temporarily associated with a different temporary address, which may be set as the second address for each communication session. In certain examples, a random temporary second address can be used each time, in some examples with the condition that each enabled second address on a common I2C bus at a particular instant is different from the other enabled addresses. In some examples a 'random' second address may be a second address which is selected from a predetermined pool of possible second addresses, which may, in some examples, be stored on the print apparatus. The temporary address may be generated by the print apparatus logic circuit 304 for each connected logic circuitry package 400a and communicated through said command.

In some examples, the logic circuitry package 400a may comprise a memory to store the second address (in some examples in a volatile manner). In some examples, the memory may comprise a programmable address memory register for this purpose.

In some examples, the package 400a is configured such that, in response to a first command indicative a first time period sent to the first address (and in some examples a task), the package 400a may respond in various ways. In some examples, the package 400a is configured such that it is accessible via at least one second address for the duration of the time period. Alternatively or additionally, in some examples, the package may perform a task, which may be the task specified in the first command. In other examples, the package may perform a different task.

The first command may, for example, be sent by a host such as a print apparatus in which the logic circuitry package 400a (or an associated replaceable print apparatus component) is installed. As set out in greater detail below, the task may comprise a monitoring task, for example, monitoring a timer (and in some examples, monitoring the time period). In other examples, the task may comprise a computational task, such as performing a mathematical challenge. In some examples, the task may comprise activating a second address and/or effectively deactivating the first address for communication purposes (or may comprise performance of actions which result in the activation or enabling of a second address and/or effectively deactivating or disabling of the first address). In some examples, activating or enabling a second address may comprise setting (e.g. writing, re-writing or changing), or triggering the setting of, a second address (for example, a temporary second address), for example by writing the second address in a portion of memory which is indicative of an address of the logic circuitry package 400a.

Where a task is specified, the task and/or time period may be specified explicitly in the first command, or may be inferred by the logic circuitry package 400a by reference to a lookup table or the like. In one example, the first command may for example comprise mode data and time data. For example, a first data field, which may be sent as part of a serial data package, may comprise a mode field. This may for example be around one or a few bits or bytes in size. A second data field, which may be sent as part of the serial data packet of the first data field in some examples, may comprise a 'dwell time' data field. For example, this may be around two or a few bits or bytes in size and may specify a time period, for example in milliseconds.

In some examples, the package 400a is configured so as to be inaccessible via the second address (the default or temporary second address or any address other the first address) for a second time period preceding (in some examples, immediately preceding) the first time period and/or for a third time period following (in some examples, immediately following) the first time period. In some examples, the first logic circuit 402a is to ignore I2C traffic sent to the first address (or any address other than a currently active second address) for the duration of the time period. In other words, the package 400a may respond to commands directed to the first address and not to commands directed to the second address outside the first time period; and may respond to commands directed to the second address and not to commands directed to the first address during the first time period. The term 'ignore' as used herein with respect to data sent on the bus may comprise any or any combination of not receiving (in some examples, not reading the data into a memory), not acting upon (for example, not following a command or instruction) and/or not responding (i.e. not providing an acknowledgement, and/or not responding with requested data). For example, 'ignoring' I2C traffic sent to the first address may be defined as the logic circuitry package 400a not responding to communications directed to the first address (or any address other than a currently active second address as perceivable by the print apparatus logic circuit 304).

Causing the first logic circuit 402a to 'ignore' (or otherwise not respond to) I2C traffic sent to the first address for the duration of the time period for which the second address is activated or in use allows the first and second addresses to be entirely independent of one another. For example, the first address may be I2C compliant whereas a second address may be of any format, including in some examples a non-I2C compliant format. In addition, if the first address is effectively disabled for the duration of the time period, consideration need not be made as to any response to a command which the package 400a may consider to be addressed to the first address. For example, the first address may be represented by a particular bit sequence and, if there is a possibility that the first address may be recognized when the package is not to be addressed using the first address, precautions may be taken such that this identifying bit sequence is avoided when the package is not to be addressed using the first address. The likelihood of this event could increase in the instance where communication is established via different temporary second addresses of respective different logic circuitry packages within a single time period over the same serial bus. If these situations are not managed correctly, indeterminate or unexpected behaviour may be seen. However, if the first address is effectively disabled during the time period, there need be no such consideration or precautions, and commands which could otherwise be inadvertently received and interpreted by the package 400a as having been received by the first address will not be received as the first address is effectively inactivated. The reverse may also be true (i.e. commands which may be inadvertently taken to be addressed to any second address will not be received by the package 400*a* outside the time period if that address is effectively disabled outside the time period).

In some examples, the first and the second addresses may be of different lengths. For example, the first address may be a 10-bit address and the second address may be a 7-bit address. In other examples, the first and second address may be of the same length, for example both comprising a 7-bit or 10-bit address. In certain examples the first and the default second address are hardwired, while the second address allows for reconfiguration to the temporary address, as explained above. In other examples the first and second address may be programmed.

In some examples, the first logic circuit 402*a* is to perform a task, which may be the task specified in the command received, for the duration of the time period. However, in other examples, for example to allow for increased compatibility, the first logic circuit 402*a* may not perform the specified task (for example, if it is unable to do so, or it is unnecessary to do so to keep the first logic circuit 402*a* 'busy', as described below).

In some examples, the first logic circuit 402*a* may in effect not respond to (i.e., ignore) requests sent to the first address as a result of performing a task, which may be a task specified in the first command. In some examples, the task may at least substantially consume the processing capacity of the first logic circuit 402*a*. For example, the task may comprise monitoring a timer in such a way that the processing capacity of the first logic circuit 402*a* is substantially dedicated to that task. In other examples, the processing capacity may be substantially dedicated to performing a computational task, such as an arithmetical task. In a simple example, the first logic circuit 402*a* may be tasked with calculating a value such as pi. This task may be, according to present understanding, unlimited in the sense that a processor could continue calculating pi to further decimal places for an infinite amount of time. Therefore, the performance of this task to completion exceeds any likely time period specified in the first command. For example, such time periods may be, in some examples, in the order of seconds or tens of seconds. If the first logic circuit is dedicated to the task of calculating pi/monitoring a timer until the time period has passed, it may not also be monitoring traffic sent thereto via a communications bus or the like. Therefore, even if the communications were sent to the first address, these would be ignored. It may be noted that certain I2C slave devices will generally ignore a bus while performing any kind of processing. However, the processing specified herein is associated with the time period. It is noted that, given that the logic circuit package is not responsive to communications to its first address for the time for which the second address is activated, in some examples, the (temporary) second address could be the same as the first address whereby the desired function corresponding to that second address may still be achieved. However, as explained before, in other examples, the second address is different to the first address.

It will be appreciated that the task of calculating pi is merely one example of a task which may generally exceed a time period specified in a first command. Other examples of computational tasks having a completion time which is likely to exceed the time period may be selected, for example based on the length of the time period under consideration. For example, if the time period is to last for no longer than 3 seconds, a processing task which will exceed 3 seconds in duration may be performed (and, in some examples, instructed in the first command). Moreover, in other examples, as noted above, the task may comprise monitoring a time period.

In other examples, the logic circuitry packages 400*a* may be configured to, in response to such a first command including the task and time period, not respond to communications directed to its first address, not necessarily by performing a processing task but effectively by being programmed not to respond.

In some examples, the package 400*a* is configured to provide a first set of responses, or to operate in a first mode, in response to instructions sent to the first address and to provide a second set of responses, or to operate in a second mode, in response to instructions sent to the second address. In other words, the address may trigger different functions provided by the package 400*a*. In some examples, at least one response of the first set of responses is output in response to commands sent to the first address and not in response to commands sent to the second address and at least one response of the second set of responses is output in response to commands sent to the second address and not in response to commands sent to the first address. In some examples, the first set of responses may be cryptographically authenticated (i.e. accompanied by a message authentication code generated using a base key, or otherwise cryptographically 'signed', and/or encrypted, see for example US patent publication No. 9619663, incorporated herein by reference) and the second set of responses is not cryptographically authenticated. In some examples, the second set of responses may relate to sensor data and the first set of responses may not relate to sensor data. In some examples, messages may be accompanied by a session key identifier. For example an identity of a logic circuit of the package 400*a* could be communicated in the first and the second set of responses, whereby it is cryptographically authenticated in the first set but not in the second set. This may allow the package 400*a* to provide two distinct functions. Data may be output from an output data buffer of the package 400*a*.

In some examples, the package 400*a* may be configured to participate in a first validation process using I2C communications sent to the first address, and to participate in a second validation process using communications sent to the second address. As noted above, the second address may be a reconfigurable address, and in some examples may be reconfigured after the first validation process has been carried out. In some examples, the first validation process may comprise an exchange of encrypted or authenticable messages, wherein the messages are encrypted and/or signed based on a base key stored in the package, which may be a secret key (or based on a secret base key) that corresponds to a secret key stored or held in the print apparatus. In some examples, the second validation process may comprise an integrity check, in which the package 400*a* may return requested data values such that a host apparatus can verify that these data values meet predetermined criteria.

In examples set out above, the addresses used to communicate with the circuitry package 400*a* have been described. Further communication may be directed to memory addresses to be used to request information associated with these memory addresses. The memory addresses may have a different configuration than the first and second address of the logic circuitry package 400*a*. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may comprise any or any combination of address register(s), parameter register(s) (for example to store gain and/or offset parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

Figure 4B:
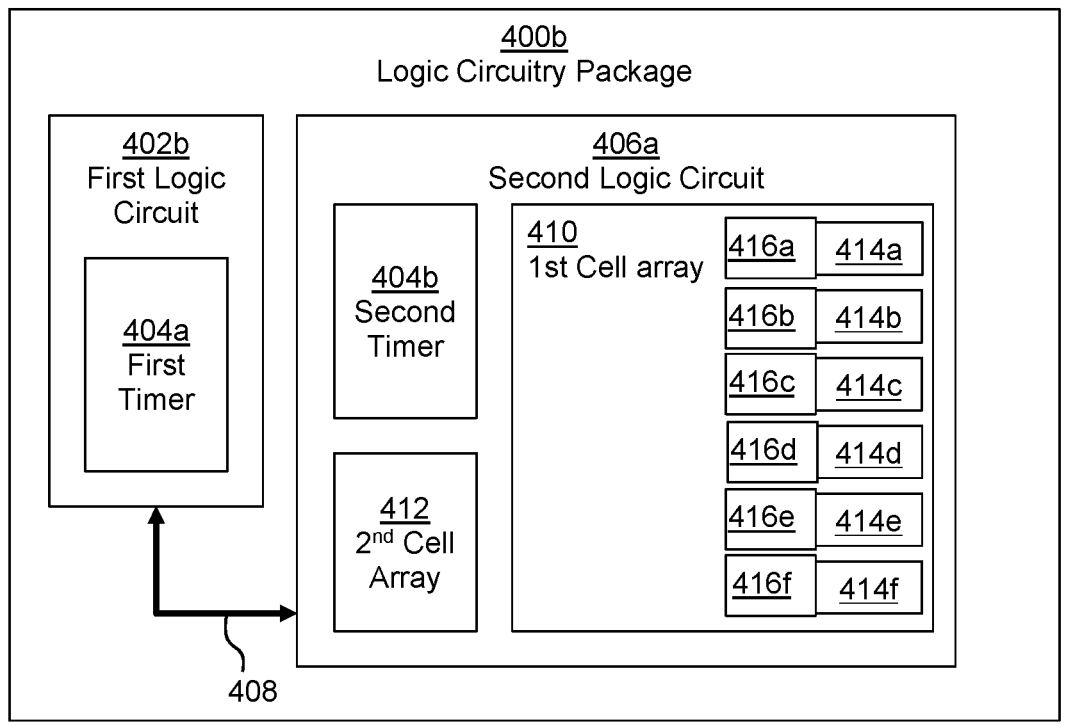

FIG. 4B shows another example of a logic circuitry package 400b. In this example, the package 400b comprises a first logic circuit 402b, in this example, comprising a first timer 404a, and a second logic circuit 406a, in this example, comprising a second timer 404b. While in this example, each of the first and second logic circuits 402b, 406a comprises its own timer 404, in other examples, they may share a timer, or reference at least one external timer. In a further example, the first logic circuit 402b and the second logic circuit 406a are linked by a dedicated signal path 408.

In one example, the logic circuitry package 400b may receive a first command comprising two data fields. A first data field is a one byte data field setting a requested mode of operation. For example, there may be a plurality of pre-defined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below.

The first command may comprise additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If however, the first command is validly received and can be complied with, the logic circuitry package 400b measures the duration of the time period included in the first command, for example utilising the timer 404a. In some examples, the timer 404a may comprise a digital "clock tree". In other examples, the timer 404a may comprise an RC circuit, a ring oscillator, or some other form of oscillator or timer. In this example, in response to receiving a valid first command, the first logic circuit 402b enables the second logic circuit 406a and effectively disables the first address, for example by tasking the first logic circuit 402b with a processing task as described above. In some examples, enabling the second logic circuit 406a comprises sending, by the first logic circuit 402b, an activation signal to the second logic circuit 406a. In other words, in this example, the logic circuitry package 400b is configured such that the second logic circuit 406a is selectively enabled by the first logic circuit 402b.

In this example, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

The voltage of the signal path 408 may be driven to be high in order to enable the second logic circuit 406a. In some examples, such a signal may be present for substantially the duration of the first time period, for example, starting following receipt of the first command and may cease at the end of the first time period. As noted above, the enablement may be triggered by a data field in the command. In other examples, the second logic circuit may be selectively enabled/disable, for example for the duration of the time period, in another way.

In some examples, such a contact pad or pin is provided in a manner so as to be generally inaccessible from the exterior of a replaceable print apparatus component. For example, it may be relatively distant from an interface and/or may be fully enclosed by a housing. This may be useful in ensuring that it is only triggered via the first logic circuit 402b.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to change the initial address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages.

In some examples, the second logic circuit 406a may comprise a memory. The memory may comprise a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406a. For example, each time the enable signal over the signal path 408 is low, the second logic circuit 406a, or the relevant part(s) thereof, may be reset. The default address may be set when the second logic circuit 406a, or the relevant part(s)

thereof, is switched out-of-reset. In some examples the default address is a 7-bit or 10-bit identification value. In some examples, the default address and the temporary second address may be written in turn to a single, common, address register.

In some examples, the address of the second logic circuit 406a may be rewritten at any time at which it is enabled. In some examples, when connected to the bus, the second logic circuit 406a may be in a low current state except when it is in an enabled state.

In some examples, the second logic circuit 406a may comprise a power-on reset (POR) device. This may comprise an electronic device which detects the power applied to the second logic circuit 406a and generates a reset impulse that goes to the entire second logic circuit 406a placing it into a known state. Such a POR device may be of particular utility in testing the package 400b prior to installation.

In some examples, a plurality of further logic circuits may be 'chained' together, with further pins (which may be GPIO pins) or the like. In some examples, once the second address has been written (i.e. the logic circuit has an address which is different to its default address), it may activate an 'out' pin or pad, and an 'in' pin or pad of the next logic circuit in the chain (if one exists) thereby be driven high and the logic circuit may be enabled. Such a further logic circuit(s) may function as described in relation to the second logic circuitry 406a. Such further logic circuits may have the same default address as the second logic circuit 406a in some examples. There is no absolute limit as to how many logic circuits can be serially chained and accessed in this way, however there may be a practical limitation in a given implementation based on the series resistance on the bus lines, the number of Slave IDs, and the like.

In one example, the first logic circuit 402b is configured to generate an enablement signal that may be an active low asynchronous reset signal. In some examples, when this signal is removed (or is driven to a logic 0), the second logic circuit 406a may immediately cease operations. For example, data transfers may immediately cease, and a default state (which may be a sleep state and/or a low current state) may be assumed by the second logic circuit 406a. In some examples, memories such as registers may revert to an initialised state (for example, a default address may comprise an initialised state of an address register).

In an example in which an I2C bus is used for communications with the package 400b, the first logic circuit 402b and the second logic circuit 406a may be connected to the same I2C bus. As noted above, an additional connection, for example provided between GPIO pins of the first logic circuit 402b and the second logic circuit 406a may be selectively enabled following receipt of a dedicated command. For example, the first logic circuit 402b may drive a dedicated GPIO pin to be high for a time period specified in a command (whereas by default the pin may be in a low state). For the duration of this time period, the first logic circuit 402b may not acknowledge ('NAK') any attempts to communicate using the first address. At the end of the specified time period, the dedicated contact pin may be returned to the 'low' state, and the first logic circuit 402b may be receptive to communications on the I2C bus sent to the first address once again. However, while the contact pin is driven to be high, the second logic circuit 406a may be enabled, and receptive to communications on the I2C bus.

It may be noted that, by sharing I2C contacts between the first logic circuit 402b and the second logic circuit 406a, electrical interconnect cost is small. Additionally, if the second logic circuit is selectively powered only for the duration of the time period, it may be less susceptible to electrochemical wear. In addition, this may allow multiple packages comprising respective first logic circuits 402b and second logic circuits 406a to be provided on the same serial I2C bus, where the second logic circuits 406a may (at least initially) share an address, which may in turn reduce manufacturing and deployment complexities.

In some examples, as outlined above, the logic circuitry package 400b comprises a first operational mode in which it responds to communication sent to the first address and not any second address and a second operational mode in which it responds to communications sent to a second address (e.g. the second address currently in use, and in some examples, currently stored in a dedicated register of the second logic circuit 406a) and not the first address.

In the example illustrated in FIG. 4b, the second logic circuit 406a comprises a first array 410 of cells and at least one second cell 412 or second array of second cells. The first cells 416 a-f, 414 a-f and the at least one second cell 412 can comprise resistors. The first cells 416 a-f, 414 a-f and the at least one second cell 412 can comprise sensors. In one example the first cell array 410 comprises a print material level sensor and the at least one second cell 412 comprises another sensor and/or other sensor array.

In this example, the first cell array 410 comprises a sensor configured to detect a print material level of a print supply, which may in some examples be a solid but in examples described herein is a liquid, for example, an ink or other liquid print agent. The first cell array 410 may comprise a series of temperature sensors (e.g. cells 414a-f) and a series of heating elements (e.g. cells 416a-f), for example similar in structure and function as compared to the level sensor arrays described in WO2017/074342 (incorporated herein by reference), WO2017/184147 (incorporated herein by reference), and WO2018/022038 (incorporated herein by reference). In this example, the resistance of a resistor cell 414 is linked to its temperature. The heater cells 416 may be used to heat the sensor cells 414 directly or indirectly using a medium. The subsequent behaviour of the sensor cells 414 depends on the medium in which they are submerged, for example whether they are in liquid (or in some examples, encased in a solid medium) or in air. Those which are submerged in liquid/encased may generally lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416.

In some examples each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 comprises a plurality of different cells that may have a different function such as different sensing function(s). For example, the first and second cell array 410, 412 may include different resistor types. Different cells arrays 410, 412 for different functions may be provided in the second logic circuit 406a.

Figure 4C:
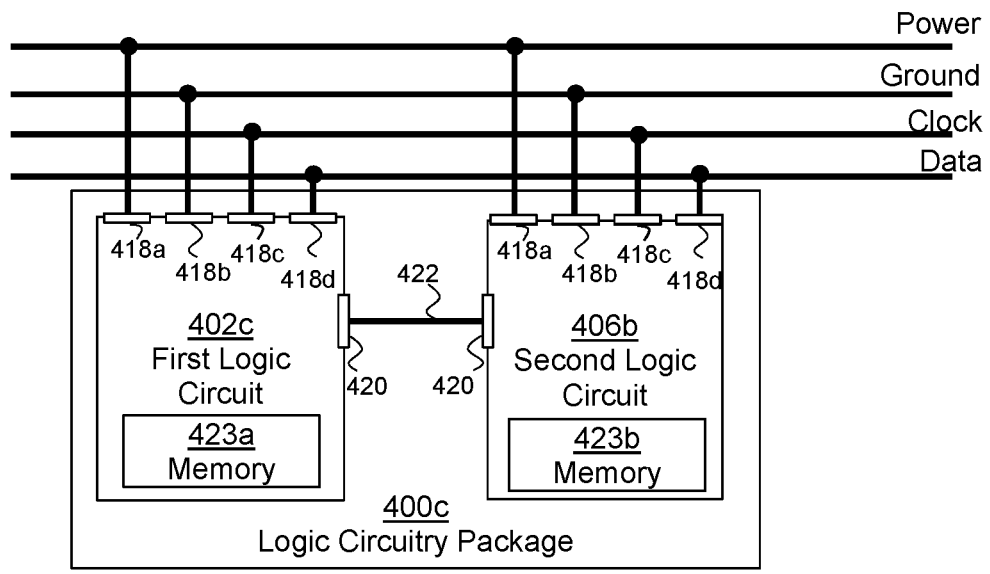

FIG. 4C shows an example of how a first logic circuit 402c and a second logic circuit 406b of a logic circuitry package 400c, which may have any of the attributes of the circuits/packages described above, may connect to an I2C bus and to each other. As is shown in the Figure, each of the circuits 402c, 406b has four pads (or pins) 418a-d connecting to the Power, Ground, Clock and Data lines of an I2C bus. In another example, four common connection pads are used to connect both logic circuits 402c, 406b to four corresponding connection pads of the print apparatus controller interface. It is noted that in some examples, instead of four connection pads, there may be less connection pads.

For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402c, 406b has a contact pin 420, which are connected by a common signal line 422. The contact pin 420 of the second circuit serves as an enablement contact thereof.

In this example, each of the first logic circuit 402c and the second logic circuit 406b comprises a memory 423a, 423b.

The memory 423a of the first logic circuit 402c stores information comprising cryptographic values (for example, a cryptographic key and/or a seed value from which a key may be derived) and identification data and/or status data of the associated replaceable print apparatus component. In some examples the memory 423a may store data representing characteristics of the print material, for example any, any part, or any combination of its type, color, color map, recipe, batch number, age, et cetera.

The memory 423b of the second logic circuit 406b comprises a programmable address register to contain an initial address of the second logic circuit 406b when the second logic circuit 406b is first enabled and to subsequently contain a further (temporary) second address (in some examples in a volatile manner). The further, e.g. temporary, second address may be programmed into the second address register after the second logic circuit 406b is enabled, and may be effectively erased or replaced at the end of an enablement period. In some examples, the memory 423b may further comprise programmable registers to store any, or any combination of a read/write history data, cell (e.g. resistor or sensor) count data, Analogue to Digital converter data (ADC and/or DAC), and a clock count, in a volatile or non-volatile manner. Use of such data is described in greater detail below. Certain characteristics, such as cell count or ADC or DAC characteristics, could be derivable from the second logic circuit instead of being stored as separate data on the memory.

In one example, the memory 423b of the second logic circuit 406b stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406b, in some operational states, the memory 423b of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measureable by the second logic circuit 406b).

While the memories 423a, 423b are shown as separate memories here, they could be combined as a shared memory resource, or divided in some other way. The memories 423a, 423b may comprise a single or multiple memory devices, and may comprise any or any combination of volatile memory e.g. DRAM, SRAM, registers, etc. and non-volatile memory e.g. ROM, EEPROM, Flash, EPROM, memristor, etc.

While one package 400c is shown in FIG. 4C, there may be a plurality of packages with a similar or a different configuration attached to the bus.

Figure 4D:
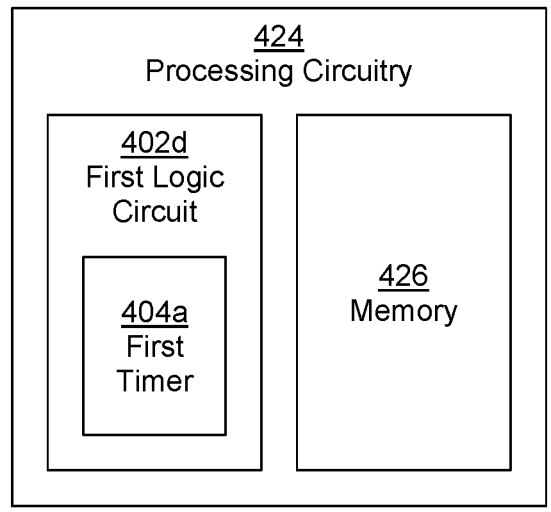

FIG. 4D shows an example of processing circuitry 424 which is for use with a print material container. For example, the processing circuitry 424 may be affixed or integral thereto. As already mentioned, the processing circuitry 424 may comprise any of the features of, or be the same as, any other logic circuitry package of this disclosure.

In this example, the processing circuitry 424 comprises a memory 426 and a first logic circuit 402d which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402d. The first logic circuit 402d may have any of the attributes of the other examples circuits/packages described in this disclosure.

The first logic circuit 402d is adapted to participate in authentication of the print materials container by a print apparatus in which the container is installed. For example, this may comprise a cryptographic process such as any kind of cryptographically authenticated communication or message exchange, for example based on an encryption key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402d may participate in a message to derive a session key with the print apparatus and messages may be signed using a message authentication code based on such a session key. Examples of logic circuits configured to cryptographically authenticate messages in accordance with this paragraph are described in the earlier mentioned US patent publication No. 9619663 (incorporated herein by reference).

In some examples, the memory 426 may store data comprising: identification data and read/write history data. In some examples, the memory 426 further comprises cell count data (e.g. sensor count data) and clock count data. Clock count data may indicate a clock speed of a first and/or second timer 404a, 404b (i.e. a timer associated with the first logic circuit or the second logic circuit). In some examples, at least a portion of the memory 426 is associated with functions of a second logic circuit, such as a second logic circuit 406a as described in relation to FIG. 4B above. In some examples, at least a portion of the data stored on the memory 426 is to be communicated in response to commands received via the second address. In some examples, the memory 426 comprises a programmable address register or memory field to store a second address of the processing circuitry (in some examples in a volatile manner). The first logic circuit 402d may enable read operation from the memory 426 and/or may perform processing tasks.

Other examples of first logic circuits 402 described herein may be adapted to participate in authentication processes in a similar manner.

The memory 426 may, for example, comprise data representing characteristics of the print material, for example any or any combination of its type, color, batch number, age, et cetera. The memory 426 may, for example, comprise data to be communicated in response to commands received via the first address. The processing circuitry may comprise first logic circuit to enable read operations from the memory and perform processing tasks In some examples, the processing circuitry 424 is configured such that, following receipt of the first command indicative of a task and a first time period sent to the first logic circuit 402d via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402d addressed using the first address, the processing circuitry 424 is to disregard (e.g. 'ignore' or 'not respond to') I2C traffic sent to the first address for substantially the duration of the time period as measured by a timer of the processing circuitry 424 (for example a timer 404a, b as described above). In some examples, the processing circuitry may additionally perform a task, which may be the task specified in the first command. The term 'disregard' or 'ignore' as used herein with respect to data sent on the bus may comprise any or any combination of not receiving (in some examples, not reading the data into a memory), not acting upon (for example, not following a command or instruction) and/or not responding (i.e. not providing an acknowledgement, and/or not responding with requested data).

The processing circuitry 424 may have any of the attributes of the logic circuitry packages 400 described herein. In particular, the processing circuitry 424 may further comprise a second logic circuit wherein the second logic circuit is accessible via the second address. In some examples the second logic circuit may comprise at least one sensor which is readable by a print apparatus in which the print material container is installed via the second address. In some examples, such a sensor may comprise a print materials level sensor.

The processing circuitry 424 may have a first validation function, triggered by messages sent to a first address on an I2C bus and a second validation function, triggered by messages sent to a second address on the I2C bus.

Figure 4E:
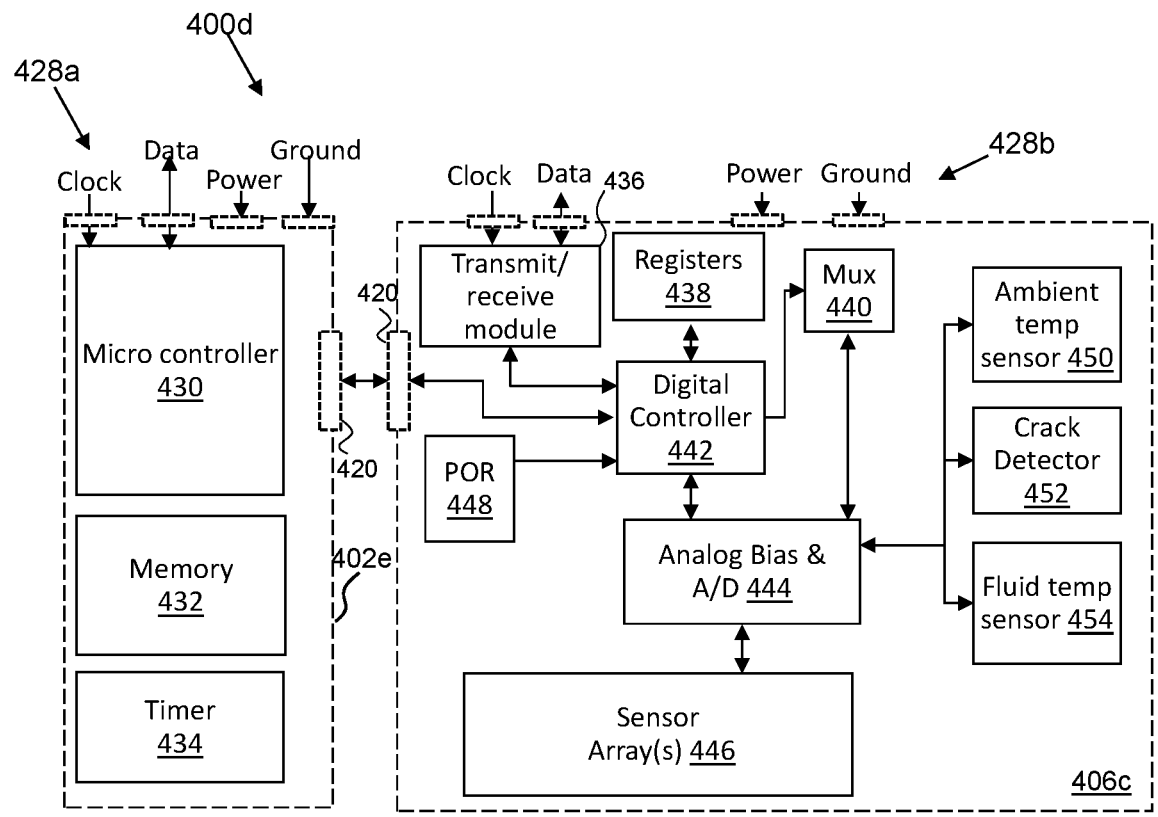

FIG. 4E shows another example of a first logic circuit 402e and second logic circuit 406c of a logic circuitry package 400d, which may have any of the attributes of the circuits/packages of the same names described herein, which may connect to an I2C bus via respective interfaces 428a, 428b and to each other. In one example the respective interfaces 428a, 428b are connected to the same contact pad array, with only one data pad for both logic circuits 402e, 406c, connected to the same serial I2C bus, see for example FIGS. 13A and 13B. In other words, in some examples, communications addressed to the first and the second address are received via the same data pad.

In this example, the first logic circuit 402e comprises a microcontroller 430, a memory 432 and a timer 434. The microcontroller 430 may be a secure microcontroller or customized integrated circuitry adapted to function as a microcontroller, secure or non-secure.

In this example, the second logic circuit 406c comprises a transmit/receive module 436 which receives a clock signal and a data signal from a bus to which the package 400d is connected, data registers 438, a multiplexer 440, a digital controller 442, an analogue bias and analogue to digital converter 444, at least one sensor or cell array 446 (which may in some examples comprise a level sensor with one or multiple arrays of resistor elements), and a power-on reset (POR) device 448. The POR device 448 may be used to allow operation of the second logic circuit 406c without use of a contact pin 420.

The analogue bias and analogue to digital converter 444 receives readings from the sensor array(s) 446 and from external sensors. For example, a current may be provided to a sensing resistor and the resultant voltage may converted to a digital value. That digital value may be stored in a register and read out (i.e. transmitted as serial data bits, or as a titstream) over the I2C bus. The analogue to digital converter 444 may utilise parameters, for example, gain and/or offset parameters, which may be stored in registers.

In this example, there are different additional single sensors, including for example at least one of an ambient temperatures sensor 450, a crack detector 452 and/or a fluid temperature sensor 454. These may sense, respectively, an ambient temperature, a structural integrity of a die on which the logic circuitry is provided and a fluid temperature.

Figure 5:
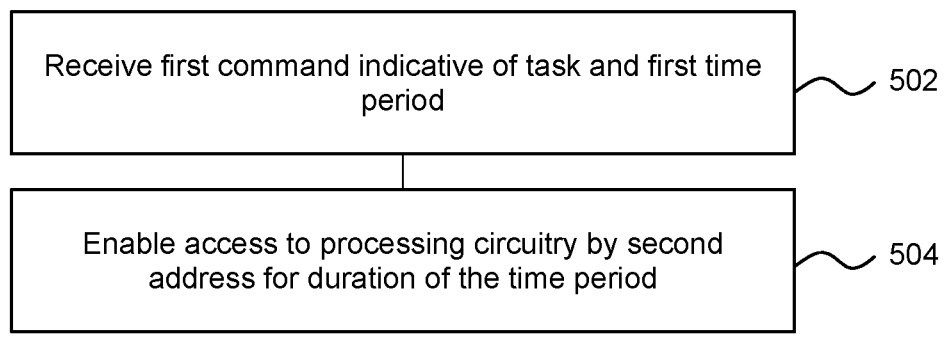
FIG. 5 is an example of a method which may be carried out by a logic circuitry package.

FIG. 5 shows an example of a method which may be carried out by processing circuitry, for example by a logic circuitry package such as the logic circuitry packages 400a-d described above, or by the processing circuitry 424 described in relation to FIG. 4D, and/or by processing circuitry provided on a replaceable print apparatus component, for example a consumable printing materials container.

Block 502 comprises receiving a first command indicative of a task and a first time period which is sent to a first address of processing circuitry. Block 504 comprises enabling, by the processing circuitry, access to the processing circuitry by at least one second address of the processing circuitry for the duration of the time period.

Figure 6:
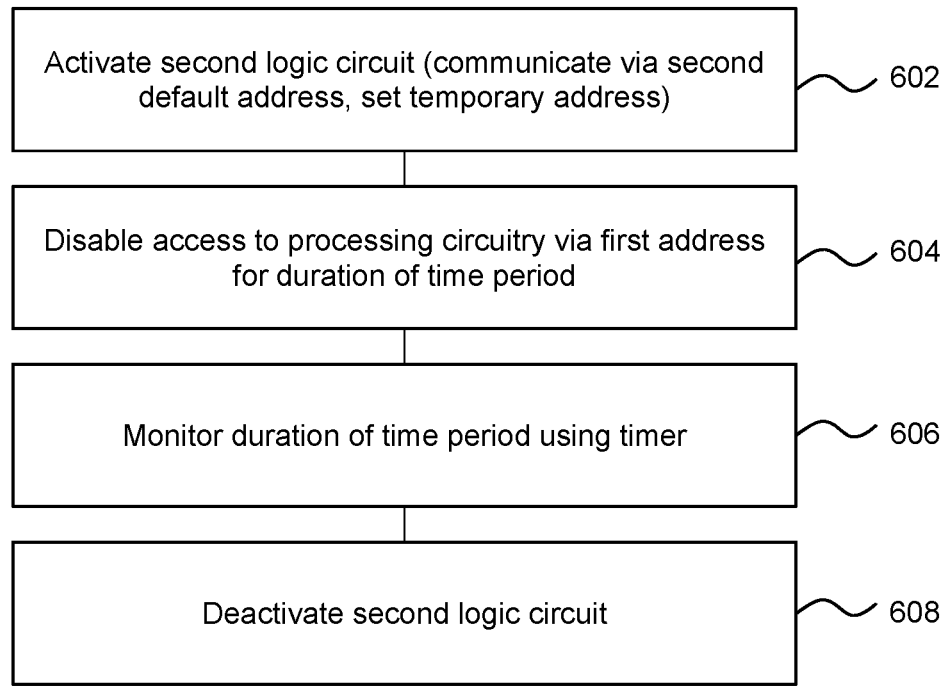
FIG. 6 is a further example of a method which may be carried out by a logic circuitry package.

FIG. 6 shows one example of the method of block 504 in greater detail. In this example, a first and second logic circuit are provided, each respectively associated with the first and at least one second address as described above with reference to FIG. 4B.

Block 602 comprises activating the second logic circuit. As described above, this may comprise a first logic circuit sending or transmitting an activation signal to a second logic circuit to activate the second logic circuit, for example via a dedicated signal path. In this example, activating the second logic circuit allows access to the processing circuitry using the at least one second address, for example using an initial or default second address. In some examples, following activation, the second logic circuit may be caused to set a new or temporary second address, for example to replace an initial or default address of the second logic circuit. In some examples, the temporary address may be set for the duration of a communication session.

Block 604 comprises disabling access to the processing circuitry via the first address (i.e. using communications addressed to the first address) for the duration of the time period by causing the first logic circuit to perform a processing task (in some examples, the processing task specified in the command received in block 502) for the duration of the time period. In other examples, the first address may be effectively disabled by preventing transmission of responses to messages sent to the first address. Block 606 comprises monitoring, by the processing circuitry, the duration of the time period using a timer of the processing circuitry. In some examples, monitoring the duration of the time period using the timer may itself comprise the processing task.

After the time period has expired, the method proceeds with block 608, which comprises deactivating the second logic circuit. For example, this may comprise removing an activation signal by the first logic circuit. Access to the processing circuitry via the second address may therefore be disabled after the duration of the time period. For example, the second logic circuit may be de-energized or placed in a sleep mode by the removal of the signal.

In examples where the end of a communication session is associated with a loss of power to at least part of the logic circuit, this loss of power may cause the second address to be discarded (for example, the second address may be held in volatile memory, whereas the initial or default address may be hardwired or held in persistent memory). After reset, the second address may again be set to the default or initial address before the beginning of a new session. In some examples, the initial or default address may be held in persistent memory and may be restored to a register of the second logic circuit when the second logic circuit is enabled. Therefore a 'new' second address may be set each time a communications session is started (although in some cases the 'new' second address may have previously been used in relation to the logic circuitry).

As set out in greater detail elsewhere herein, during the period of activation, the second logic circuit may provide services, for example cell or sensor readings or the like. However, in other examples, the second logic circuit may for example provide an output such as activating a light or sound (for example, the second logic circuit may control a light source or speaker or some other apparatus), may receive data (for example, may comprise a memory which is to store a data file), and/or may provide some other type of output or service.

Figure 7:
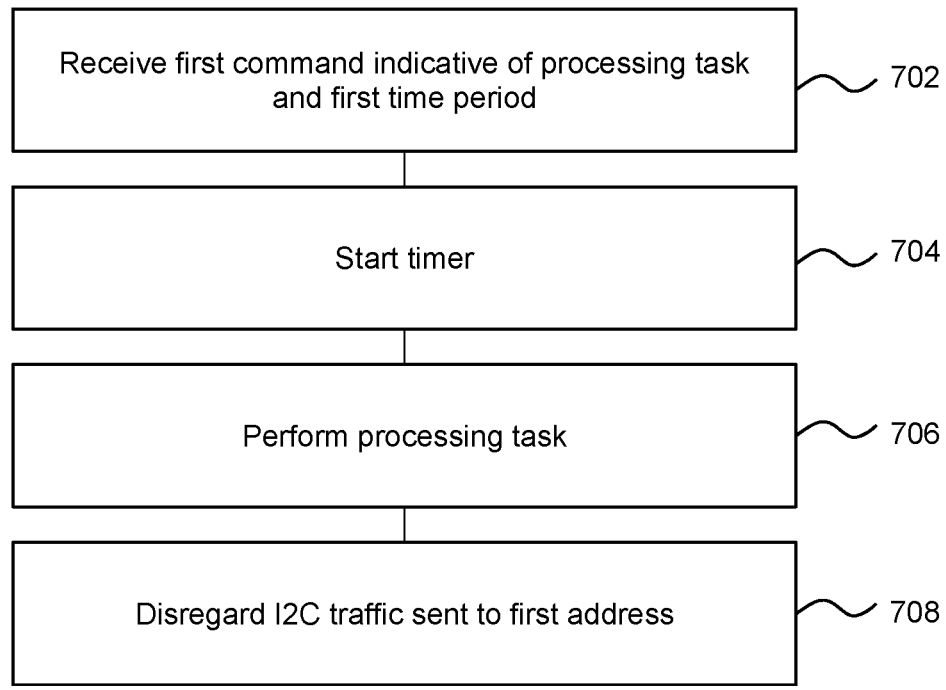
FIG. 7 shows an example of a method which may be carried out for example by processing circuitry.

FIG. 7 shows an example of a method which may be carried out for example by processing circuitry 424 or by a package 400*a-d* as described above. The method comprises, in block 702, receiving a first command indicative of a processing task and a first time period sent to a first address of processing circuitry via a communications bus, for example an I2C bus.

Block 704 comprises starting a timer of the processing circuitry. In other examples, a timer may be monitored rather than started. For example, an initial count of the timer may be recorded and an increase in the count may be monitored.

Block 706 comprises performing, by the processing circuitry, a processing task and block 708 comprises disregarding traffic sent to the first address. In some examples, disregarding the I2C traffic may be as a result of performing the task specified in the command, or another task. The task may comprise monitoring a timer. In other examples, the task may comprise a computational task, such as working to solve a mathematical challenge.

Block 708 may continue until the time period expires, as monitored using the timer.

The method may comprise any of the features described above in relation to a tasks and/or to disregarding (e.g. 'ignoring' or simply 'not responding to') traffic. The method may be carried out using processing circuitry which is associated with, or provided on, a printing material container and/or a replaceable print apparatus component.

In some examples, as described above, the method may comprise, for the duration of the time period, responding, by the processing circuitry, to I2C traffic sent to a second address of the processing circuitry. In some examples, the first address is associated with the first logic circuit of the processing circuitry and the second address is associated with the second logic circuit of the processing circuitry. In some examples, where first and second logic circuits are provided, the first logic circuit may perform the processing task and/or may send an activation signal to the second logic circuit, for example via a dedicated signal path, for the duration of the time period. In some examples, the second logic circuit may be deactivated by ceasing the activation signal.

Figure 8:
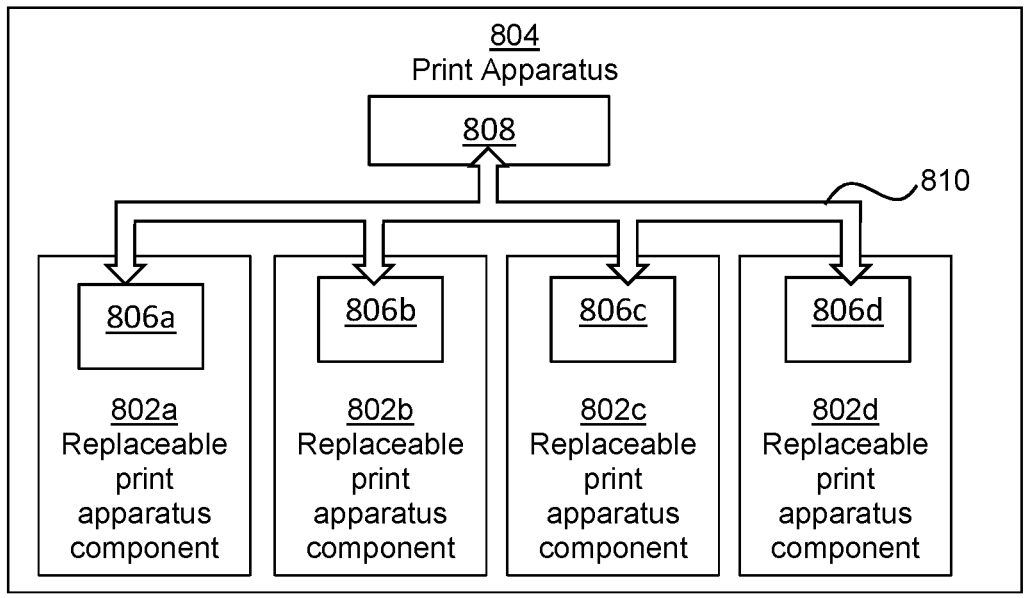
FIG. 8 shows an example arrangement of replaceable print apparatus components in a print apparatus.

FIG. 8 schematically shows an arrangement in which a plurality of replaceable print apparatus components 802*a-d* are provided in a print apparatus 804.

Each of the replaceable print apparatus components 802*a-d* is associated with a logic circuitry package 806*a-d*, which may be a logic circuitry package 400*a-d* as described above. The print apparatus 804 comprises host logic circuitry 808. The host logic circuitry 808 and the logic circuitry packages 806 are in communication via a common I2C bus 810. In one mode of operation, each of the logic circuitry packages 806 has a different first address. Therefore, each of the logic circuitry packages 806 (and by extension, each of the replaceable print apparatus components) may be addressed uniquely by the host print apparatus 804.

In an example, a first command may be sent to a particular one of the replaceable print apparatus component logic circuitry packages 806, i.e. being addressed using the unique first address for that logic circuitry package, instructing it to enable its (at least one) second address for a corresponding 'first command' time period. Therefore, that replaceable print apparatus component 802 may, for example, enable at least one second address and/or, in some examples, its associated functions. In some examples this results in enabling a second logic circuit as described above. For example, the addressed logic circuitry package 806 may ignore (e.g. not acknowledge and/or not respond to) I2C traffic sent to the first address of that logic circuitry package 806 for the duration of the first command time period, for example in response to the same command or a separate command. The other print apparatus components 802 may also be sent a second command resulting in them ignoring I2C traffic sent to their first addresses for the duration of a 'second command' time period. As noted above, when there are no other slave devices 'listening' to the I2C bus, restrictions as to the form and content of messages sent over the I2C bus may be reduced. Therefore, in this way, all of the first addresses may be effectively disabled whilst only one second address is in communication with the I2C bus 810. In other examples, more than one packages may be addressable by respective different addresses at the same time. In some examples, a first command may also result in an addressed component/package ignoring I2C traffic sent to their first addresses for the duration of the first command time period, and/or a second command may also result in an addressed component/package being accessible via at least one second address.

In some examples, the logic circuitry package(s) 806 may perform a processing task, which may be a processing task as specified in a command, so as to 'keep busy' and ignore I2C traffic sent to the first address for the duration of the specified time period. As noted above, this may comprise a computing task or a monitoring task, for example monitoring a timer.

Thus, the logic circuitry packages 806 may be configured to have a first response to a first command, which results in a second address of that package being enabled for the duration of the first command time period, and a second response to a second command, which results in the package ignoring I2C traffic sent to the first address (for example by performing a processing task such as monitoring a timer and/or carrying out a computational task which absorbs processing capacity) for the duration of the second command time period. In other words, each of the logic circuitry packages 806 may be enabled to carry out either of the methods of FIGS. 5 and/or 7, depending on the nature of the command received.

To consider a particular example, a host device such as a print apparatus 804 in this example wishing to communicate with a particular logic circuitry package 806 via its second address—in this example logic circuitry package 806*a*— may issue commands so as to instruct the other logic circuitry packages 806*b-d* to act in a manner which results in them ignoring traffic on the bus 810. This may comprise the logic circuitry 808 serially sending three commands addressed to a unique address of each of the other logic circuitry packages 806*b-d*, each command specifying a first mode of operation and a time period. The first mode of operation may result in traffic on the bus being ignored. Next, the logic circuitry 808 may send a dedicated command to the target logic circuitry package 806*a* via its first address, the command specifying a second mode of operation and a time period. The second mode of operation may comprise an instruction resulting in traffic on the bus 810 sent to a first address being ignored and enablement of a second address. The first command time period and the second command time period for which traffic is ignored by different logic circuit packets 806 may be specified to overlap with one another, in some examples bearing in the mind the delay with which instructions will be received.

The host logic circuitry may then communicate with the selected logic circuitry package 806*a* via its second address for the duration of the time period. During this time period, as in some examples no other devices are 'listening' to the I2C bus, any communication protocol (including in some examples a non-I2C compliant protocol) may be used for communicating with the selected logic circuitry package 806*a* via its second address.

Of course, this is only one example. In other examples, some or all packages may be accessible via a second address concurrently, or a mixture of first and second addresses of respective packages may be accessible.

Figure 9:
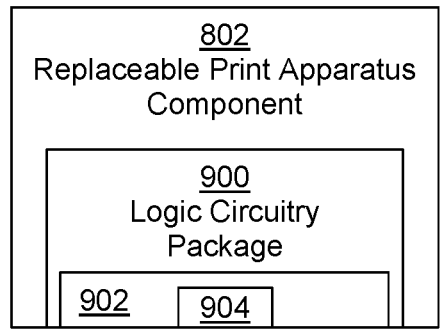
FIG. 9 shows an example of a replaceable print apparatus component.

FIG. 9 shows an example of a replaceable print apparatus component 802 which includes an I2C compatible logic circuitry package 900, which may comprise any of the attributes of the packages 400*a-d* or of the circuitry 424 described in relation to FIGS. 4A-E, and which may in some examples be configured to carry out any of the methods described herein. The package in this example comprises an I2C interface 902 including a data contact 904 to communicate via an I2C bus of a host printer.

The package in this example comprises a memory comprising data representing print liquid characteristics, and the data is retrievable and updatable via the data contact 904. The package 900 is configured to, in response to a read request received from a host apparatus via a first I2C address (i.e. the read request is addressed using the first address), transmit data including said data representing print liquid characteristics over the bus and via the data contact 904. Different replaceable print apparatus components 802 may be associated with memories which may store different print liquid characteristics.

The package 900 is further configured such that, in response to a command indicative of a task and a first time period received via the first address, the package transmits data for the duration of the time period over the same bus and data contact in response to (and in some examples, only in response to) received commands which are addressed to at least one second address, different than the first address, and after the end of the time period, again transmit data over the same bus and data contact in response to (and in some examples, only in response to) received commands which are addressed to the first address.

In some examples, the at least one different address includes a default second address and a further or temporary second address wherein the package 900 is configured to, in response to a received command which is addressed to the default second address, reconfigure the address to be the temporary second address and/or to respond to (and in some examples, only in response to) subsequent commands sent to the temporary second address until the end of the time period. Such responses may be sent over the same bus and the single data contact 904.

The replaceable print apparatus component 802 may be provided as one of a plurality of print apparatus components, the memories of which store different print material characteristics. The package of each of the plurality of replaceable print apparatus components may be configured to, in response to a command indicative of the task and the first time period received via respective first addresses, transmit data responses to received commands which are addressed to the same respective default addresses.

In some examples, the package 900 is configured to transmit, in response to indicated received commands which are addressed to the first address outside the time period, data that is authenticated, for example, cryptographically authenticated, for example using a secret key and accompanied by a message authentication code. During the time period, however, data which is not authenticated may be transmitted in response to received commands which are addressed to the at least one different address.

Figure 10:
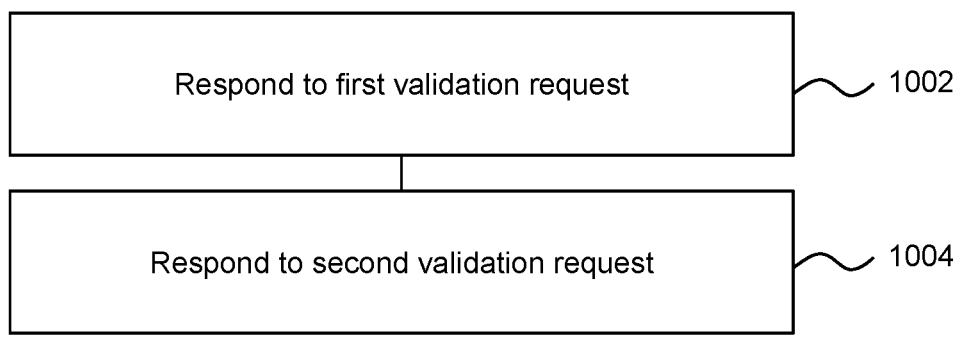
FIG. 10 is an example of a method of validating a print apparatus component.

FIG. 10 describes a method of validating a print apparatus component using logic circuitry associated therewith. In some examples, the logic circuitry may be a logic circuitry package 404*a-d*, 900 and/or processing apparatus 424 as described above.

For example, in validating a print apparatus component, it may be intended to verify that a print agent container originates from an authorized source, so as to ensure the quality thereof (for example, by performing an authentication thereof). In some examples, the validation process may include an integrity check to ensure that the replaceable print apparatus component and/or the logic circuitry associated therewith is functioning as expected. This may comprise requesting sensor information such that logic circuitry of a print apparatus component can check that this sensor data complies with expected parameters.

The method comprises, in block 1002, responding to a first validation request sent via an I2C bus to a first address associated with the logic circuitry with a first validation response. Block 1004 comprises responding to a second validation request sent via the I2C bus to a second address associated with the logic circuitry with a second validation response.

In some examples, the first validation response is a cryptographically authenticated response. For example, this may make use of a shared secret and/or use a cryptographic key. In some examples, the cryptographic response may comprise at least one 'signed' message, for example a message accompanied by a message authentication code, or may comprise an encrypted response. In some examples, the second validation response comprises an unencrypted response(s), or unsigned response(s). In some examples, most or all responses to validation requests sent to the first address are cryptographically signed using a key stored on the logic circuit, while no responses to validation requests sent to the second address are cryptographically signed. This may allow processing resources used to provide responses to commands sent to the second address to be reduced.

Figure 11:
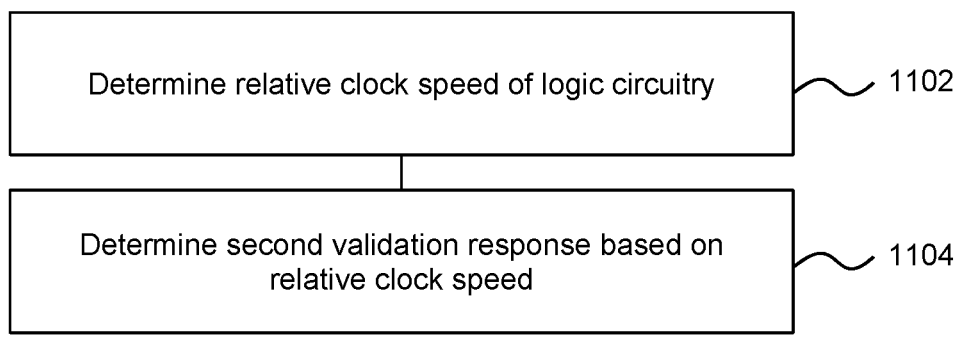
FIG. 11 is a further example of a method of validating a print apparatus component.

FIG. 11 describes one example of block 1004 in greater detail. In this example, the second validation request comprises a request for an indication of the clock speed of a timer of the logic circuitry (in some examples, a request for a clock speed of the second timer 404b, or more generally a timer associated with the second logic circuit). The method comprises, in block 1102, determining a clock speed of the logic circuitry relative to a frequency of another system clock or cycle signal measurable by the logic circuitry. Block 1104 comprises determining a second validation response based on the relative clock speed. This may, for example, allow a time period to be set by a host apparatus in the context of a timer provided with the logic circuitry. In some examples, the clock speed of a timer of the logic circuitry itself may be measured in order to determine the validation response. For example, the number of clock cycles of the timer within a predetermined number of other clock signals/measurable cycles may be determined, and, in some examples, an indication of the result may be provided as the validation response. In some examples, a clock speed may effectively be determined by comparing a known clock speed of a timer of the logic circuitry with the clock speed. In some examples, the validation response may comprise a selection of a value (e.g. a clock count) held in a memory indicating the clock speed of the logic circuitry relative to a system clock/measurable cycle. As has been noted above, in one example the response may be based on the clock speed of an internal timer of the second logic circuit, which may be a second timer in addition to a first timer of the first logic circuit.

To consider one example of such a method, the logic circuitry may comprise a number of registers. In one example, a register may record the number of outputs of a timer of a logic circuitry package (in some examples, a timer associated with a second logic circuit) over a set number of cycles detectable by the logic circuitry. For example, over 8 detectable cycles, there may be, say, 120 cycles recorded using the internal timer of the logic circuitry package. This may be recorded in one or more registers. In such example, the value "120" could be recorded on a register or memory, which may be read and verified by the print apparatus logic circuit, wherein verification may for example comprise comparing the value with an expected value. In one example, this relative clock speed value may be represented by the clock count that is mentioned in examples of this disclosure. In another example, the clock count can relate to an absolute clock speed. The clock speed can be measured and compared with a stored clock count. In this disclosure, the stored clock count may include any value representing the relative clock speed or clock count including a reference value or a range.

In some examples, a system clock may be set to take account of a speed of the timer. In some examples, a system clock may be driven by a ring oscillator of the second logic circuit as described above. The second logic circuit may comprise multiple timers such as both a SAR clock (for the analogue to digital converter) and a system clock.

Figure 12:
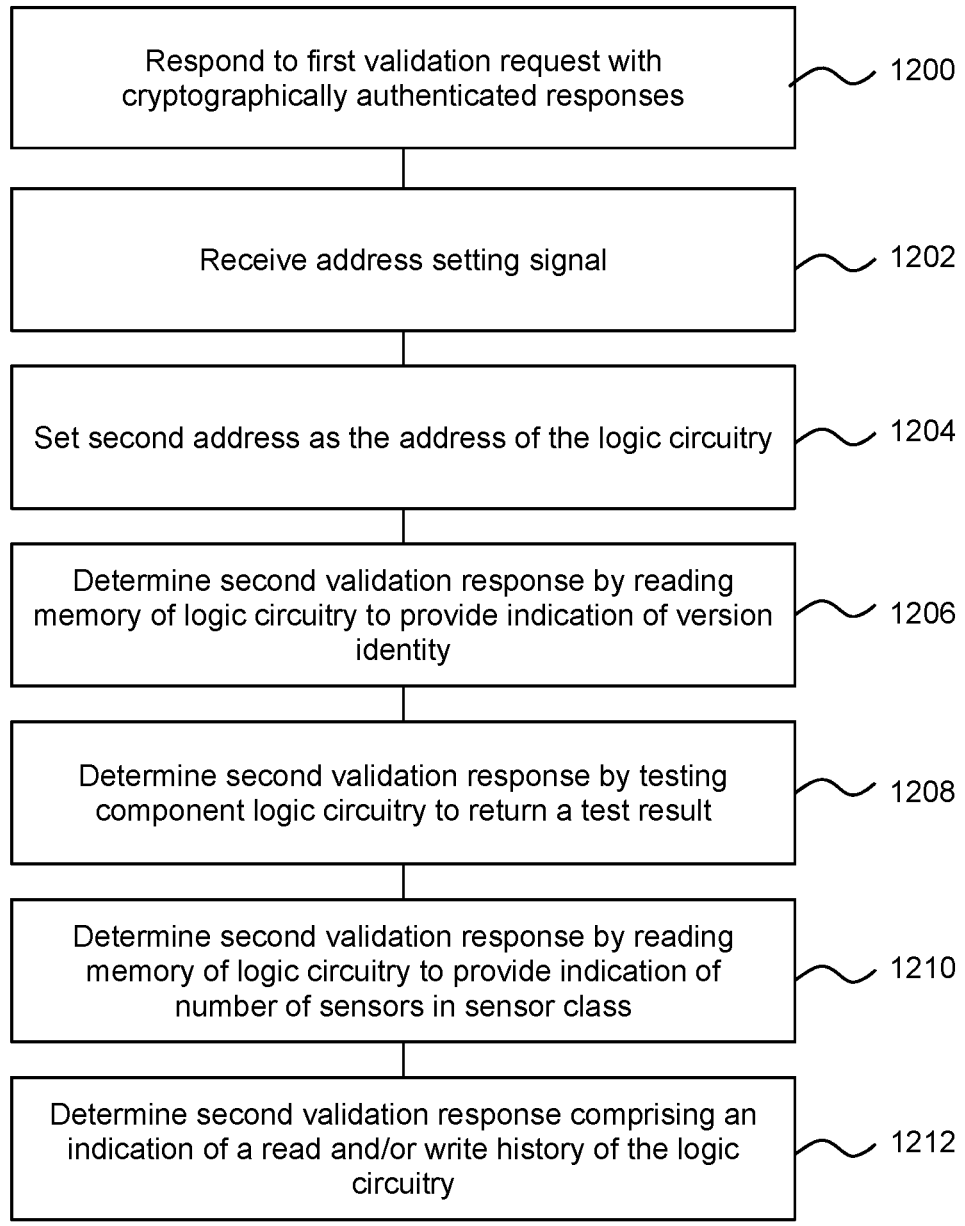
FIG. 12 shows another example of a method of validation.

FIG. 12 shows another example of a method of validation, which may be a method of validating a print apparatus component using logic circuitry associated therewith. In some examples, the logic circuitry may be a logic circuitry package 404a-d, 900 and/or processing apparatus 424 as described above.

In this example, the logic circuit package responds to a first validation request directed to its first address with cryptographically authenticated responses in block 1200. As part of the first validation any or any combination of a version identity (i.e. revision ID) of (at least part of) the package; a number cells per class; a print material level; a clock count; a read/write history data and other identity and characteristics data related to the second address may be included. In some examples, identification data associated with a second logic circuit, such as the version identity, as described above may be stored in a first logic circuit. In some examples, the identification data may be stored in both the first and the second logic circuits. In some examples, after a second logic circuit has been enabled, as described above, the method comprises in block 1202, receiving an address setting signal, which is sent via the I2C bus to an initial second address associated with logic circuitry. In some examples, the address setting signal may be indicative of a temporary second address. For example host logic circuitry (e.g. logic circuitry of a print apparatus) may select and/or generate the temporary second address, and transmit this to the logic circuitry associated with the replaceable print apparatus component. In other examples, the temporary second address may be selected in some other way, for example based on data held in a memory of the logic circuitry. Block 1204 comprises setting the second address as the address of the logic circuitry. As noted above, in some examples, this may comprise replacing a default address with a temporary address which may be selected, in some examples, by a print apparatus.

In some examples, the temporary second address may be retained for the duration of a communication period, and then the address may revert to the initial address (which may therefore provide a default address). In some examples, the initial address is reinstated on the next occasion that the second logic circuit is enabled.

The method continues in block 1206 by determining the second validation response by reading a memory of logic circuitry to provide an indication of version identity. This may be an indication of the version of hardware, software and/or firmware used in the logic circuitry package, for example in a second logic circuit of the package. In some examples, this may be an indication of the version of at least one sensor which may be provided as part of the logic circuitry. The version identity (i.e. revision ID) of the second validation may match the version identity of the first validation.

For example, this may comprise providing one or more 'revision value', which may be the content of one or more registers. It may be the case that at least one, and in some examples, each, die and/or subcomponent of the logic circuitry is associated with a revision value which indicates the type or version of hardware, and may allow a master I2C circuit to provide more appropriate communications.

Assuming that the returned values meet predetermined criteria (for example, an expected number of revision values is returned and/or the revision value is recognised by a host print apparatus, or has a valid format or the like), the method continues in block 1208 by determining a further second validation response by testing at least one component of the logic circuitry to return a test result. While sensors may not be provided in association with all logic circuitry (and/or a test thereof may not be performed), in some examples, the second validation response may comprise an actual test of any provided sensors or cells involved in communications through the second address. For example, this may comprise a test to indicate that a cell and/or a resistor is responding as expected. For example, the test may include verifying the absolute or relative clock speed, for example by comparing the measured clock speed with a stored clock speed, as described above. In some examples an expected value for the clock speed may be determined based on the indication of version identity (e.g. the 'revision value'). For example, it may be determined that a particular version of hardware is expected to have a particular response value.

In block 1210 the method comprises determining a further second validation response by reading a memory of logic circuitry to provide an indication of the number of cells or sensors in at least one sensor class. In some examples, the returned number of this second validation should match a sensor count provided in the first validation. For example, this may provide an indication of the number of resistors in a fluid level sensor. In some examples, there may be a plurality of values provided relating, for example, to different sensor types. This validation feature may allow a print apparatus to configure parameters for later reading of the sensors. In addition, if this value is not an expected value, which may be determined by matching values provided in the first and second validations, it may result in the logic circuitry failing a validation test. In some examples the expected value may be determined based on the second validation response. For example, it may be determined that a particular version of hardware is expected to have a particular number of sensors.

In this example, a read and/or write status of at least part of the logic circuitry, (in some examples, the read/write history of a second logic circuit) is recorded in a memory thereof on an ongoing basis, for example between actions associated with each block of FIG. 12. In particular, in this example, a plurality of indications of a read/write status is stored in a memory, each being determined using a different predetermined algorithmic function. Such algorithmic functions (which may be secret algorithmic functions, or based on secret data, wherein the solution is also derivable based on a secret known by the print apparatus in which the replaceable print apparatus component is to be arranged) may be applied such that different read/write actions result in a different value being stored. The algorithmic function may include scrambling, e.g. signing the read/write history value, which may be executed by hardwiring or written instructions on the logic circuitry package. In some examples, the content of the read and/or write may be considered by the algorithm such that the same number of read/write operations may result in a different value being associated with the history if the content of the read/write operations differ. In some examples, the order of read/write operations may also impact the value stored. The algorithm could be stored or hardwired in the logic circuitry package, for example in the second logic circuit. In some examples, the read/write history status value can be used for data communication error checking. In some examples, the logic circuitry package is configured to update the read/write history after read/write events. For example, the second logic circuit may be configured, for example hardwired, to re-write the read/write history data portion after each respective read or write action on the second logic circuit, wherein the read/write history data portion may be re-written after or at each read or write cycle. The read/write history data portion may be updated after a read request from the print apparatus, a write request from the print apparatus, or both. For example, the updating may be based on an internal output buffer refresh, or it may be based on a received instruction of the print apparatus circuit. The second logic circuit may be hardwired to update the read/write history data portion based on actions of the second logic circuit. In an example, the logic circuitry package is configured to not update the read/write history when reconfiguring the second address to the temporary address. In an example, the logic circuitry package is configured to update the read/write history during the measured time period, after configuring the second address to the temporary address. In yet another example the print apparatus rewrites the read/write history data field.

In this example, therefore, the method further comprises storing a plurality of indications of the read/write history status of the logic circuitry and updating the stored indication with each read/write request of the logic circuitry.

In block 1212, the method comprises determining a further second validation response which comprises an indication of a read and/or write history of the logic circuitry. The response may be selected based on an indication provided in the request, such that an expected value, associated with a particular algorithmic function is selected and returned. The algorithmic function may be stored or hardwired in the logic circuitry package, for example the second logic circuit. The algorithmic functioning may include signing the read/write history data. Providing a number of different algorithmic functions may assist in increasing security of the validation process.

In one example, the logic circuitry comprises at least one register (e.g. read-only) that creates a value representing a signature, i.e. that allows for decoding and checking by a print apparatus that stores the data to decode the signature. A value indicative of the read/write history may be stored therein and may be updated when operations (reads/writes) occur within the logic circuitry, and therefore provides an indication of a read and/or write history of the logic circuitry. It may not be the case that all actions result in the register being updated and there may be at least one register access event that does not result in the value being updated. The order of the read/writes may have an effect on the values. As the host apparatus may keep its own history of the reads and writes it requests of the logic circuitry, it can verify the value against its own record to determine if the read/writes are being performed and/or if the function to determine the value is operating as expected.

In this example, while such methods may be thought of as pseudo-cryptographic methods, as they may be based on a shared secret, the second validation response may be provided without a digital signature or message authentication code or session key or session key identifier, nor may it qualify as cryptographically authenticated communication, whereas the first validation response may be provided with a digital signature, message authentication code or session key and/or session key identifier and may qualify as cryptographically authenticated communication. In one example, the different validations may be associated with different logic circuits that can be integrated in the package in a relatively cost-efficient way without compromising system integrity.

In some examples, the methods of any of FIGS. 10 to 12 may be carried out in relation to replaceable print apparatus components in which sensors are likely to contact printing fluids. Such contact may mean that the sensors are liable to suffer damage and therefore verifying that the sensors are acting as intended may be particularly beneficial. However, the methods may also be carried out in relation to other types of replaceable print apparatus components.

In some examples if any validation response is not as expected (or, in some examples, if a response and/or an acknowledgement of a request is not received), a print apparatus may determine that a replaceable print apparatus component has failed a check, and, in some examples, may reject the replaceable print apparatus component. In some examples, at least one operation of the print apparatus may be prevented or altered as a result of a replaceable print apparatus component failing a check.

In some examples, the validation responses may be provided in time slices, with each test being carried out in a serial manner.

Figure 13A:
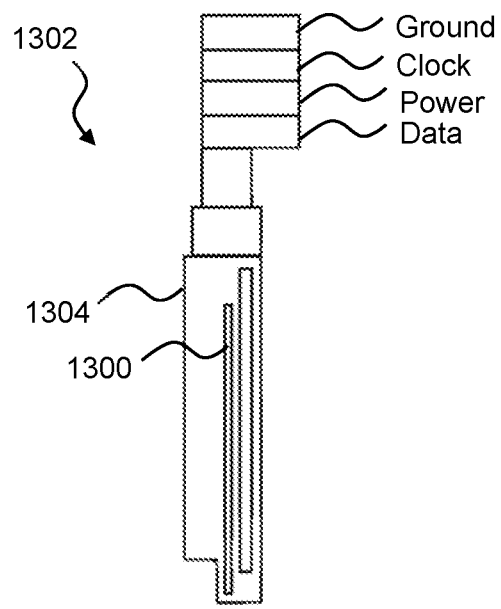
FIG. 13A shows an example arrangement of a fluid level sensor.

FIG. 13A shows an example of a possible practical arrangement of a second logic circuit embodied by a sensor assembly 1300 in association with a circuitry package 1302. The sensor assembly 1300 may comprise a thin film stack and include at least one sensor array such as a fluid level sensor array. The arrangement has a high length:width aspect ratio (e.g. as measured along a substrate surface), for example being around 0.2 mm in width, for example less than 1 mm, 0.5 mm or 0.3 mm, and around 20 mm in length, for example more than 10 mm, leading to length:width aspect ratios equal to or above approximately 20, 40, 60, 80 or 100:1. In an installed condition the length may be measured along the height. The logic circuit in this example may have a thickness of less than 1 mm, less than 0.5 mm or less than 0.3 mm, as measured between the bottom of the (e.g. silicon) substrate and the opposite outer surface. These dimensions mean that the individual cells or sensors are small. The sensor assembly 1300 may be provided on a relatively rigid carrier 1304, which in this example also carries Ground, Clock, Power and Data I2C bus contacts.

Figure 13B:
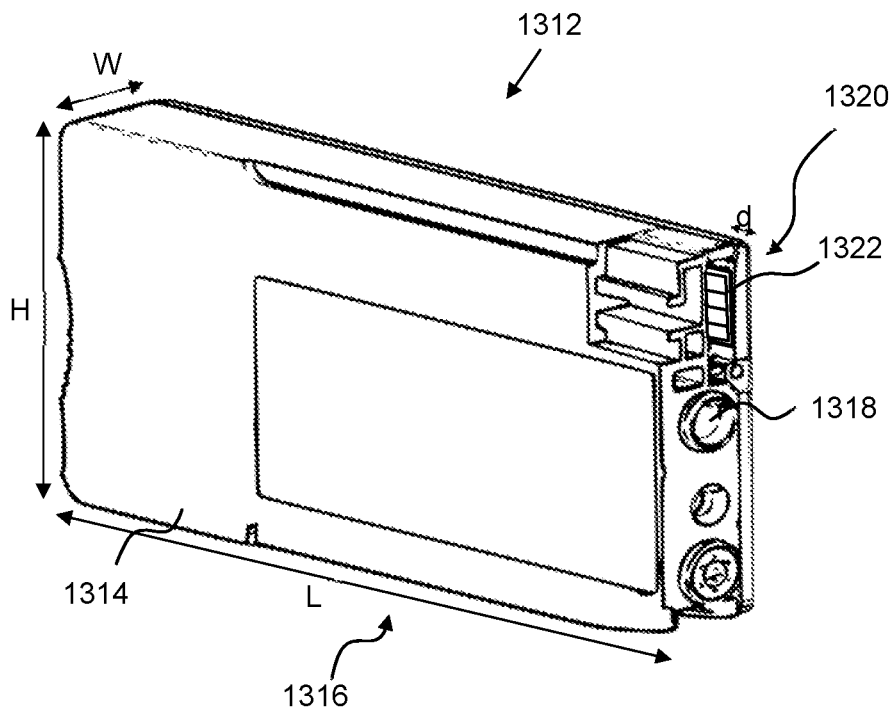
FIG. 13B shows an example of a perspective view of a print cartridge

FIG. 13B shows a perspective view of a print cartridge 1312. The print cartridge 1312 has a housing 1314 that has a width W less than its height H and that has a length L or depth that is greater than the height H. A print liquid output 1316 (in this example, a print agent outlet provided on the underside of the cartridge 1312), an air input 1318 and a recess 1320 are provided in a front face of the cartridge 1312. The recess 1320 extends across the top of the cartridge 1312 and I2C bus contacts (i.e. pads) 1322 of a logic circuitry package 1302 (for example, a logic circuitry package 400a-d, 900 as described above) are provided at a side of the recess 1320 against the inner wall of the side wall of the housing 1314 adjacent the top and front the housing 1314. In this example, the data contact is the lowest of the contacts 1322. In this example, the logic circuitry package 1302 is provided against the inner side of the side wall.

In some examples the logic circuitry package 1302 comprises a sensor assembly as shown in FIG. 13A.

It will be appreciated that placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method as set out in relation to FIGS. 10 to 12 may be used to verify that communications with the logic circuitry based on a specific communication sequence provide expected results. This may validate the operational health of the logic circuitry.

In other examples, a replaceable print apparatus component includes a logic circuitry package of any of the examples described herein, wherein the component further comprises a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (I.e. the pads are partially inset from the edge by a distance d). The rest of the logic circuitry package may also be provided against the inner side.

In some examples, the print cartridge comprises a print material container comprising a validation circuitry package comprising a memory, a contact array for connecting with a I2C bus of a print apparatus, at least one timer, and circuitry to provide a first validation function, triggered by messages sent to a first address on an I2C bus; and a second validation function, triggered by messages sent to a second address on the I2C bus.

In pre-existing print apparatus components such as print cartridges, logic circuitry packages may consist of integrated circuits sometimes referred to as microcontrollers or secure microcontrollers. These integrated circuits are configured to store, communicate and update status and characteristics of corresponding print apparatus components, sometimes in a secure manner. Said status may include a level of print material, for example updated by the print apparatus after each print job and based on drop count and/or page count. Basing the status on drop count or page count implies an indirect way of measuring a remaining print material level because it may be based on, e.g., global print statistics rather than the contents of the individual print apparatus component. Consequently, the status or characteristics of a print apparatus component, as stored and reflected by its associated logic circuitry package could be wrong or not reliable.

This disclosure addresses first example logic circuitry packages adapted to enable connecting further sense devices to a print apparatus component, or including those sense devices. This disclosure also addresses other examples of logic circuitry packages that are configured to be compatible with a print apparatus logic circuit that is designed to be compatible with (e.g. read, write and/or command) the first example logic circuitry packages.

As said, different examples of this disclosure facilitate different sub-devices in a circuit package of a replaceable print component to communicate with a printer controller, for example in addition to, or instead of, the afore mentioned microcontroller-based integrated circuits alone, which are typically not configured to directly measure certain components' status.

In one example, the logic circuit package allows for a relatively secure and reliable communication while controlling costs and/or manufacturing. Certain examples of this disclosures facilitate adding capabilities to (partly) existing communication protocols in printers, such as the existing I2C busses that communicate with integrated circuits on the print apparatus components.

In one example, this disclosure explores inclusion of, for example, lab-on-chip type, cell arrays (e.g. as part of "second logic circuits") in print apparatus component logic circuitry packages, which in one example may be implemented in conjunction with existing print apparatus interface buses, for example in an effort to control costs and reliability. As explained earlier, examples of second logic circuits include thin, silicon-based, sensor arrays. In one example these sensors do not use established or standard digital data communication protocols such as I2C. Rather they may rely on custom analogue signal communications. Some of the examples of this disclosure involve the integration of such memory arrays in logic circuitry packages of print apparatus components.

Figure 14:
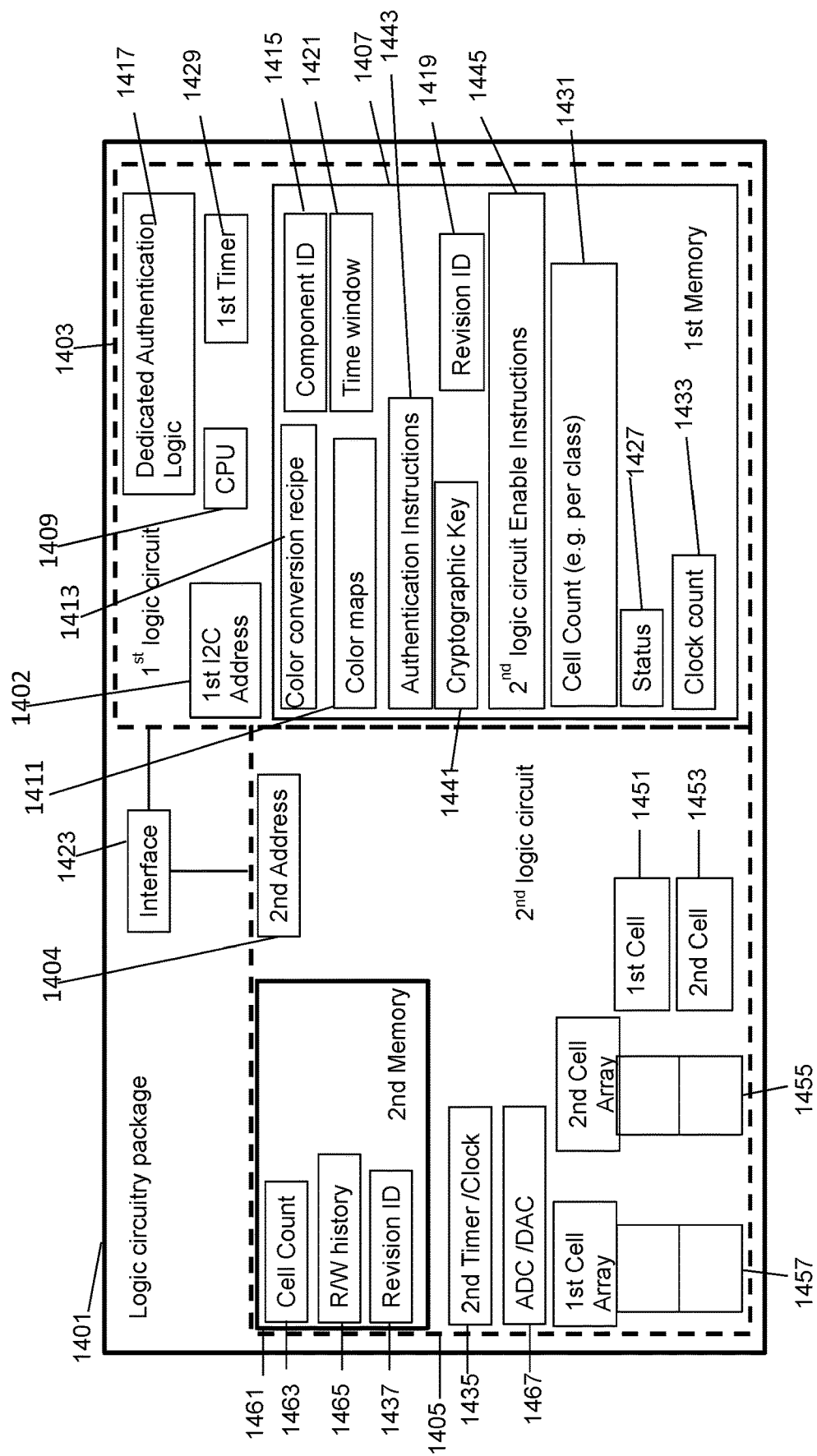
FIG. 14 shows an example of a logic circuitry package.

FIG. 14 represents different specific examples of a logic circuitry package including such sensor arrays.

In certain examples, integrating relatively unexplored, sometimes relatively complex, sense devices to print apparatus components could lead to unanticipated problems in the field. For example, the manufacturer may not be able to predict exactly how the innovation may work out after several years on the shelves in different climate conditions and then in a connected state during and between different printing conditions. In addition, unanticipated cost and manufacturing issues could arise. Also there may be a desire to provide an alternative component to connect to the same print apparatus for other reasons. To alleviate any of these potential challenges or other challenges, certain print apparatus components such as print service cartridges may not be equipped with sensor arrays. Accordingly, this disclosure also encompasses other example logic circuitry packages that are compatible with a host print apparatus logic circuit that was originally adapted to communicate to the second logic circuits with sensors, which host print apparatus may in certain instances already be operational at many different customer locations around the globe prior to designing these other compatible packages. These other compatible packages are adapted to not rely on the same second logic circuits with sensors to communicate with the original host print apparatus logic circuit. In these examples, certain physical hardware components such as sensor devices may, at least partly, be replaced by different virtual or hardwired components or data representative of the different properties or states depending on the received printer command, which may allow the print apparatus to accept these logic circuitry packages as including original sensor arrays. In addition to being operable, these compatible packages may need to pass certain integrity checks such as the mentioned first and second validations.

Figure 15:
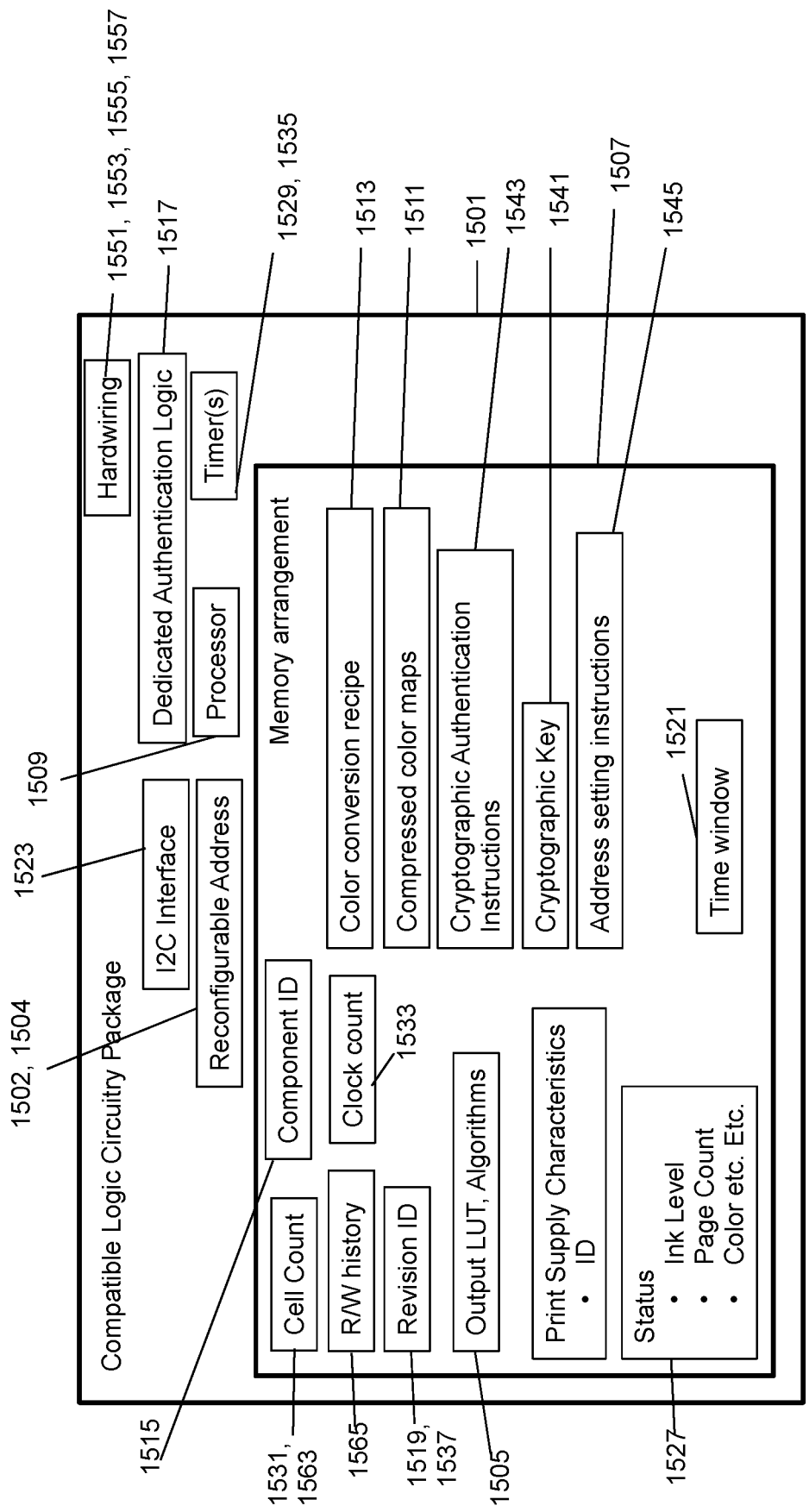
FIG. 15 shows a further example of a logic circuitry package.

In one example, these compatible packages can be relatively cheap or relatively easy to manufacture. In other examples, these compatible packages can be more reliable then the sensor-arrays logic circuitry package of this disclosure. In again other examples, these compatible packages provide for an alternative to sensor array-based second logic circuits. In again other examples, these compatible packages may facilitate testing or servicing the print apparatus or other components of the print apparatus. The compatible package may be designed to output similar responses to print apparatus logic circuit commands so that the print apparatus logic circuit accepts the responses, as if an original second logic circuit is installed. In certain examples, the compatible integrated circuits could be provided when the certain sensor-array based logic circuitry packages in the field fail to replace these failing integrated circuits; to save costs; because they are easier to manufacture; as an alternative; or for other reasons. FIG. 15 discloses an example of such other, compatible logic circuit package. Earlier mentioned examples also encompass such alternative package, such as for example FIG. 4B.

FIG. 14 illustrates a logic circuitry package 1401 for a replaceable print component to interface with a print apparatus logic circuit through a single interface package and having a second logic circuit 1405 with cell or sensor arrays. The logic circuitry package 1401 may include a first logic circuit 1403 and a second logic circuit 1405, although the sub-features that will be described below could be provided in a single package without a clear distinction between first and second logic circuit 1403, 1405. In fact, the illustrated logic circuitry package 1401 may include some, not all, of the illustrated sub-components. The illustrated sub-components have been addressed in other examples of this disclosure. Some of the features are explained in relation to the first and second validations. For a better understanding of certain features of FIG. 14 reference is made to all the publications cited in this disclosure, all of which pertain to the present applicant.

The first logic circuit 1403 includes a first address (indicated by a block 1402), which may be a first I2C address, and which may be different than other packages of other components that are to be connected to the same host apparatus at the same time. The second logic circuit 1405 may include a second address (indicated by block 1404) which, at least before or at enabling the second logic circuit 1405, may be the same as other packages of other components that are to be connected to the same host apparatus at the same time. At or after enablement of the second logic circuit 1405 the second address may be reconfigured, for example to be different than other connected packages 1401.

The first logic circuit 1403 includes a memory 1407 and a CPU (central processing unit) 1409. The memory 1407 may include a signed and unsigned portion, for example depending on desired security of a particular data feature, as desired by an OEM and/or partly by available space of each signed or unsigned portion. The memory 1407 may store at least one of characteristics, status and identity data 1415, 1419/1437 associated with the replaceable print component. The characteristics may include colour, print material type, colour maps 1411, colour conversion recipes 1413, and other characteristics. The identity 1415 could include a product number, brand and/or any code to be associated with the identity of the replaceable print apparatus component, for example for association with a warranty of an OEM should that be necessary or for other reasons. In certain examples, the identity or identities 1419/1437, 1415 may intentionally be left blank, for example when a third party supplies other than the OEM the package 1401. The status may include data for association with a relative or absolute print material level 1427, for example based on at least one of page count, drop count and/or based on a status of cells 1451, 1453, 1457, 1455 of the second logic circuit 1403, 1405. The first logic circuit 1403 may further include a cryptographic key 1441 to cryptographically authenticate messages, which messages may include any of said status, characteristics and/or identity.

The logic circuitry package 1401 includes an interface 1423 to interconnect the package sub-components including the first and second logic circuit 1403, 1405 to the print apparatus interface bus, for example including three or four I2C compatible interconnect pads. The logic circuitry package 1401 may include separate, dedicated authentication logic 1417. The dedicated authentication logic may include its own dedicated processor separate from the CPU 1409, for example especially designed to perform a specific calculation cycle a high number of times within a short time window 1421. The time window 1421 may be stored in the memory 1407. The logic circuitry package 1401 may include a first timer 1429 to measure a timer period as indicated in a command, for example to execute a specific task such as enabling a second logic circuit. The first logic circuit 1403 may include, or be connected to, a signal path and/or switch to enable the second logic circuit 1405 and/or to determine a time from which the logic circuitry package 1401 is to respond to commands directed to the second, reconfigurable, address (indicated by a block 1404).

The memory 1407 may store characteristics related to the second logic circuit 1405. The memory 1407 may store a cell count 1431 for each of at least one class of cells 1451, 1453, 1457, 1455, to be associated with a number of cells of the respective class(es). The memory 1407 may store a clock count 1433 which may be associated with a relative or absolute clock speed of a second timer 1435. The memory 1407 may store a revision ID 1419 to be associated with a revision ID 1437 of the second logic circuit 1405.

Some of the previously mentioned data may be included as digitally signed data, such as, for example, at least one of the time window 1421, the revision ID 1419, the colour conversion recipe 1413, the colour maps 1411, the cell count 1433. In one example the cryptographic key 1441 is stored in separate, secure hardware memory which should be understood as being encompassed by the first memory 1407.

Furthermore, the memory 1407 may store at least one of instructions 1443 to cryptographically authenticate messages using the key 1441; instructions 1443 to provide an authenticated challenge response within the time window 1421; and instructions 1445 to enable/activate the second logic circuit 1405 based on a respective command including a timer period and/or a task, including measuring the time period for example with the first timer 1429; and other authentication or non-authentication instructions. The logic circuitry package 1401 may be configured such that communications in response to the commands directed to the first address can be cryptographically authenticated using the cryptographic key 1441, for example being accompanied by a message authentication code and/or session key identifier, while responses to commands directed to the second address may not be cryptographically authenticated using the key 1441, for example not being accompanied by a message authentication code and/or session key identifier.

The second logic circuit 1405 includes a number of cells 1451, 1453 or cell arrays 1455, 1457 of different classes, the numbers of which may correspond to the cell counts 1431, 1463. The illustrated example includes four different cell classes but there may be more or less classes of different cells. For example, of each class, the cells may have a similar resistance, size, material or other property. An array of cells may include at least 50 or at least 100 cells. The cells may be adapted to heat or to sense a certain property such as presence of print material adjacent the cell. The cells may include resistors with or without sensing or heating properties, or dummy cells to receive signals only without influencing a read or write action. Depending on the type of cells, at least one ADC and/or DAC 1467 may be used to convert signals between digital and analogue, for example to facilitate signal conversions via the interface 1423.

The second logic circuit 1405 may include a second timer 1435 which may determine an internal clock speed, which clock speed may correspond to the stored clock count 1433.

The second logic circuit 1405 may store a revision ID 1437, which may be associated with certain properties by the print apparatus. The print apparatus may compare the first and second revision ID stored on the respective first and second logic circuit 1403, 1405, as explained in relation to the first and second validation responses.

The second logic circuit 1405 may be configured to communicate, the at least one cell count 1463 pertaining to each respective class of cells, which may correspond to the cell count 1431 of the first logic circuit 1403. In another example the cells per class may be probed by the print apparatus logic circuit or the logic circuitry package when installed in the print apparatus. For example, a cell count of the second logic circuit 1405 may be determined by measuring a last sensor or last sensor property. The read or tested cell count may be compared to the cell count stored in the first logic circuit 1403.

The logic circuitry package 1401 may include a field or data portion 1465 storing a read/write history associated with read and write actions associated with the second address 1404, for example the temporary second address 1404. The logic circuitry package may be configured to update that field after each respective read/write session, using an algorithmic function that may be partly based on the contents of the read/write session and/or on other variables, which function may some form of bit scrambling.

The second logic circuit 1405 may include a second memory arrangement 1461 that stores at least one of these second logic circuit characteristics, such as the cell count 1463, R/W history 1465 and/or revision ID 1437.

As mentioned earlier in relation to a first and second validation, in one example, communications from the second logic circuit 1405 are not cryptographically authenticated using the same cryptographic key as communications from the first logic circuit 1403 and/or are not cryptographically authenticated at all. In one example the signal output of the second logic circuit 1405 may be hardwired to scramble its output signals which in turn may be decoded by the print apparatus logic circuit.

FIG. 15 illustrates a compatible logic circuitry package 1501 configured to have similar responses to respective print apparatus commands as the logic circuitry package 1401 of FIG. 14. The logic circuitry package 1501 includes an interface 1523 to connect to the print apparatus interface bus, for example including three or four I2C compatible interconnect pads. The first logic circuitry package 1501 includes a memory 1507 and a CPU (central processing unit) 1509. The package 1501 may store instructions 1545 to respond to corresponding commands directed to (i) a first address; and, at an enable command including a time period, (ii) an initial second address; and when receiving a reconfigured address, (iii) a reconfigured second address (as indicated by block 1502, 1504). The memory 1507 may store at least one of characteristics 1515, 1519, 1537, including identity data and a status 1527 associated with the replaceable print component.

This example package 1501 may include certain LUTs, algorithms 1505 and/or hardwiring 1551, 1553, 1555, 1557 configured to generate responses that the print apparatus logic circuit associated with these cells. In one example, the hardwiring of the logic circuitry package 1501 has similar properties as the cell arrays and cells of FIG. 14, to assist in generating compatible output signals or receiving input signals. In one example the hardwiring is to receive input signals and/or to mimic cells such as resistors and registers. In one example, the hardwiring may include a second timer or clock corresponding to a clock count 1533. In another example the second logic circuit of FIG. 14 may be replaced by a full virtual emulation, for example using said LUT and/or algorithm 1505, without additional hardwiring. The output LUT 1505 may be configured to associate certain received commands and signals with certain acceptable outputs, for example at least partly based on an updated status 1527. In addition to, or instead of, the output LUT 1505, algorithms may be provided to generate compatible outputs. Hence, the output LUTs, algorithms 1505, and the hardwiring 1551, 1553, 1555, 1557 may be configured to represent a sensor array 1451, 1453, 1455, 1457 or a complete second logic circuit 1405 (FIG. 14), which in this example of FIG. 15, is at least partly virtual and does not need to represent an actual status of the print component in the way the print apparatus would interpret this. Rather the LUT, algorithm 1505 and/or hardwiring 1551, 1553, 1555, 1557 may facilitate a working, compatible logic circuitry package 1501 to be able to print with the print apparatus.

The compatible package 1501 stores the revision ID 1519, 1537, for example in one field or in two fields, or is at least configured to provide it to the print apparatus based upon a corresponding read request. The revision ID 1519, 1537 is another ID that the print apparatus logic circuit may associate with the second logic circuit, which as explained in this example may not be present physically but may to some extent be represented virtually. Similarly, the package 1501 may store a cell count 1531, 1563, a clock count 1533 which may or may not be associated with a relative or absolute clock speed of the timer 1529, 1535. The logic circuitry package 1501 may be configured to store and/or output read/write history 1565 associated with commands to the reconfigured second address 1504. The revision ID, cell count, clock count and read/write history may be readably provided in response to read requests via the second address, for example the reconfigured second address, and in a further example may not be cryptographically authenticated using the cryptographic key 1541.

Certain features of this logic circuitry package 1501 may be similar to, or the same as, the first logic circuit 1403 of FIG. 14. For example, the characteristics may include colour, print material type, colour maps 1511, colour conversion recipes 1513, and other characteristics. The identity or identities 1515 could include a product number, brand and/or any code to be associated with the identity of the replaceable print apparatus component. The status 1527 may include data that the print apparatus associates with a print material level. The logic circuitry package 1501 may include a cryptographic key 1541 to cryptographically authenticate messages, which messages may include any of said status, characteristics and/or identity. The logic circuitry package 1501 may include separate, dedicated authentication logic 1517 and store a corresponding time window 1521. The logic circuitry package 1501 may include a first timer 1529, 1535 to measure a timer period as indicated in a respective command. In one example a single timer device 1529, 1535 could be used to represent the first and second timer.

Furthermore, the package 1501 may store at least one of instructions 1543 to cryptographically authenticate messages using the key 1541; instructions 1543 to provide an authenticated challenge response within the time window 1421; and instructions 1545 to set the address 1502, 1504 based on a respective command including a timer period and/or a task, including measuring the time period for example with the timer 1529, 1535; and other authentication or non-authentication instructions. The logic circuitry package 1401 may be configured such that communications in response to the commands directed to the first address are cryptographically authenticated using the cryptographic key 1541, for example being accompanied by a message authentication code and/or session key identifier, while responses to commands directed to the second address may not be cryptographically authenticated using the key 1541, for example not being accompanied by a message authentication code and/or session key identifier.

Some of the previously mentioned data portions may be stored as digitally signed data, such as, for example, at least one of the time window 1521, the revision ID 1519, 1537, the colour conversion recipe 1513, the colour maps 1511, the cell count 1533 and other data, to allow a printer to correspondingly decode/unsign the data.

In the examples of FIGS. 14 and 15 interface connection pads of the interface 1423, 1523 of the logic circuitry package 1401, 1501 may correspond to the interface contacts illustrated in FIGS. 13A and 13B. The example of FIG. 15 may be provided entirely or largely on the outside of the print apparatus component of FIG. 13B while the example of FIG. 14 may be provided partly or largely inside of the print apparatus component of FIG. 13B (e.g. against an inner wall of the print material reservoir), except for the interface connection pads.

Each of the logic circuitry packages 400*a-d*, 806*a-d*, 900, 1401, 1501 described herein may have any feature of any other logic circuitry packages 400*a-d*, 806*a-d*, 900, 1401, 1501 described herein or of the processing circuitry 424. The processing circuitry 424 described herein may have any feature of the logic circuitry packages 400*a-d*, 806*a-d*, 900, 1401, 1501. Any logic circuitry packages 400*a-d*, 806*a-d*, 900, 1401, 1501 or the processing circuitry 424 may be configured to carry out at least one method block of the methods described herein. Any first logic circuit may have any attribute of any second logic circuit, and vice versa.

Examples in the present disclosure can be provided as methods, systems or machine-readable instructions, such as any combination of software, hardware, firmware or the like. Such machine readable instructions may be included on a machine readable storage medium (including but is not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g. a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfill the functions of several units recited in the claims.

The features of any dependent claim may be combined with the features of any of the independent claims or other dependent claims.

In some examples, the disclosure comprises any of the following Statements.

Statements

1. A logic circuitry package configured to communicate with a print apparatus logic circuit,
wherein the logic circuitry package is configured to respond to communications sent to a first address and to at least one second address, and
the logic circuitry package comprises a first logic circuit, wherein the first address is an address for the first logic circuit, and
the package is configured such that, in response to a first command indicative of a task and a first time period sent to the first address, the package is accessible via at least one second address for a duration of the time period.

2. A logic circuitry package according to Statement 1 wherein the package is for association with a print material container.

3. A logic circuitry package according to Statement 2 further comprising a memory storing data representative of at least one characteristic of the print material container.

4. The logic circuitry package according to any preceding Statement that is configured to be I2C compatible and wherein at least of the first and second addresses are I2C compatible addresses.

5. A logic circuitry package according to any preceding Statement wherein the package is not accessible via the second address for a second time period preceding the first time period and/or for a third time period following the first time period.

6. A logic circuitry package according to any preceding Statement which is configured to:
respond to communications sent to the first address and not to communications sent to the second address(es) outside the first time period; and
respond to communications sent to the second address(es) and not to communications sent to the first address during the first time period.

7. A logic circuitry package according to any preceding Statement configured to set the second address to an initial second address at each start of the first time period.

8. A logic circuitry package according to Statement 7 wherein the package is configured to set its second address to a temporary address in response to a command sent to the initial second address, the command including that temporary address.

9. A logic circuitry package according to Statement 7 or 8, wherein, on receipt of a subsequent command indicative of the task and the first time period sent to the first address, the logic circuitry package is configured to have the same initial second address.

10. A logic circuitry package according to any preceding Statement wherein the first logic circuit is to perform the task for the duration of the time period.

11. A logic circuitry package according to Statement 10 in which the task comprises at least one of:
activating the second address, deactivating the first address, transmitting a signal to another logic circuit of the package, re-configuring the initial second address to a different, temporary second address, performing a computational task, and monitoring a timer of the first logic circuit.

12. A logic circuitry package according to any preceding Statement wherein the first logic circuit comprises a timer to measure the duration of the time period.

13. A logic circuitry package according to any preceding Statement wherein the first logic circuit is configured to not respond to commands sent to the first address for the duration of the time period.

14. A logic circuitry package according to any preceding Statement wherein the package is configured to operate in a first mode in response to communications sent to the first address and to operate in a second mode in response to communications sent to the second address.

15. A logic circuitry package according to any preceding Statement wherein the package is configured to provide a cryptographically authenticated set of responses in response to cryptographically authenticated communications sent to the first address and to provide a second, not cryptographically authenticated, set of responses in response to communications sent to the at least one second address.

16. A logic circuitry package according to any preceding Statement further comprising a second logic circuit, wherein the second address is an address of the second logic circuit.

17. A logic circuitry package according to Statement 16 wherein the second logic circuit includes at least one of a non-volatile memory, a plurality of registers, a timer, and read and/or write buffers.

18. A logic circuitry package according to Statement 16 or 17 wherein the second logic circuit comprises at least one sensor or sensor array.

19. A logic circuitry package according to any of Statements 16 to 18 wherein the package comprises a dedicated signal path between the first and second logic circuit, and the at least one second address is enabled by the first logic circuit sending a signal via the dedicated signal path and wherein the package is configured to activate the second logic circuit in response to the first command.

20. A logic circuitry package according to Statement 19 wherein the signal is present for the duration of the time period.

21. A logic circuitry package according to any preceding Statement which comprises at least one sensor or sensor array.

22. A logic circuitry package according to Statement 20 wherein the at least one sensor or sensor array comprises at least one of a print material level sensor and another sensor type.

23. A logic circuitry package according to any preceding Statement which is configured to transmit, outside of said time period and in response to communications sent to the first address, communications that are authenticated using a key, and which is further configured to transmit, during said time period and in response to communications sent to the second address, communications which are not authenticated using that key.

24. A logic circuitry package according to any preceding Statement which is configured to transmit, outside of said time period and in response to communications sent to the first address, print material level-related data that is authenticated using an key, and which is further configured to transmit, during said time period and in response to communications sent to the second address, print-material level-related data not authenticated using that key, wherein print-material level-related data is data that the print apparatus logic circuit interprets and represents as print material level of a print component to which the logic circuitry package pertains.

25. A logic circuitry package according to Statement 23 or 24 wherein the key is an encryption key and/or a secret base key.

26. A replaceable print apparatus component including the logic circuitry package of any preceding Statement, the component further comprising a volume of liquid, the component having a height that is greater than a width and a length that is greater than the height, the width extending between two sides, and wherein:
the package comprises interface pads for communicating with the print apparatus logic circuit and the interface pads are provided at an inner side of one of the sides facing a cut-out for a data interconnect to be inserted, the interface pads extending along a height direction near a top and front of the component, and the interface pads comprising a data pad, the data pad being a bottom-most of these interface pads,
and the liquid and air interface of the component is provided at the front on the same vertical reference axis parallel to the height direction wherein the vertical axis is parallel to and distanced from the axis that intersects the interface pads.

27. A replaceable print apparatus component as Statementented in Statement 26 wherein the rest of the logic circuitry package is also provided against the inner side.

28. A plurality of packages according to any of Statements 1 to 25 having different first addresses and the same second address.

29. A replaceable print apparatus component including an I2C compatible logic circuitry package, wherein the I2C compatible logic circuitry package comprises:
an I2C interface including a data contact to communicate via an I2C bus of a host print apparatus;
a memory comprising data representing print liquid characteristics, the data retrievable and updatable via the data contact;
wherein the package is configured to transmit data including said data representing print liquid characteristics to the bus over the data contact; and
wherein the package is further configured to, in response to a command indicative of a first time period sent to a first address, subsequently respond to commands sent to at least one second address for a duration of the time period over the same bus and data contact; and
after the end of the time period, again respond to commands transmitted to the first address over the same bus and data contact.

30. A replaceable print apparatus component according to Statement 29, wherein the command is also indicative of a task.

31. A replaceable print apparatus component according to Statement 29, wherein
the second address includes an initial second address, and the package is configured to, in response to a command to the initial second address including a temporary address, respond to data sent to the temporary address until the end of the time period over the same bus and data contact.

32. A print cartridge comprising an I2C compatible logic circuitry package according to any of Statement 1 to 25 and having a housing that has a width that is less than a height, wherein, in a front face, from bottom to top, a print liquid output, an air input and a recess are provided, respectively, the recess extending at the top, wherein I2C bus contacts of the package are provided at a side of the recess against an inner side of a side wall of the housing adjacent the top and front of the housing, the data contact being the lowest of the contacts.

33. A print cartridge according to Statement 32, wherein the first logic circuit of the package is also provided against the inner side of the side wall.

34. A method comprising:
in response to a first command indicative of a task and a first time period sent to a first address of processing circuitry via a communications bus, enabling, by the processing circuitry, access thereto via at least one second address for a duration of the time period.

35. A method according to Statement 34 wherein the method is carried out on processing circuitry provided on a replaceable print apparatus component.

36. A method according to Statement 34 or 35 further comprising disabling access to the processing circuitry via the first address for the duration of the time period.

37. A method according to Statement 34 to 36 further comprising disabling access to the processing circuitry via any second address after the duration of the time period.

38. A method according to Statements 34 to 37 further comprising monitoring the duration of the time period using a timer of the processing circuitry.

39. A method according to any of Statements 34 to 38 wherein the first address is associated with a first logic circuit and the second address is associated with a second logic circuit, and method comprises performing, by the first logic circuit, the task for the duration of the time period.

40. A method according to any of Statements 33 to 38 wherein the first address is associated with first logic circuit and the at least one second address is associated with second logic circuit, and wherein enabling access to the processing circuitry via the second address comprises activating the second logic circuit.

41. A method according to Statement 40 wherein the method comprises the first logic circuit sending an activation signal to the second logic circuit to activate the circuitry.

42. A method according to Statement 41 wherein the method further comprises deactivating the second logic circuit by ceasing the activation signal.
43. A method according to any of Statement 40 to 42 comprising sending the activation signal via a dedicated signal path.
44. A method according to any of Statements 34 to 43 wherein the second address is configured to be an initial second address at the start of the first time period.
45. A method according to Statement 44 comprising reconfiguring, by the processing circuitry, the initial second address to a temporary address in response to a command sent to the initial second address and including that temporary address during the first time period.
46. A method according to Statement 44 or Statement 45, wherein, on receipt of a subsequent command indicative of the task and the first time period sent to the first address, the processing circuitry is configured to have the same initial second address.
47. Processing circuitry for use with a replaceable print apparatus component comprising:
  a memory and first logic circuit to enable a read operation from the memory,
  wherein the processing circuitry is accessible via an I2C bus of a print apparatus in which the replaceable print apparatus component is installed and is associated with a first address and at least one second address, and the first address is an I2C address for the first logic circuit, and
  wherein the first logic circuit is to participate in authentication of the replaceable print apparatus component by a print apparatus in which the replaceable print apparatus component is installed; and
  the processing circuitry is configured such that, following receipt of a first command indicative of a first time period sent to the first logic circuit via the first address, the processing circuitry is accessible via at least one second address for a duration of the time period.
48. Processing circuitry according to Statement 47, wherein the processing circuitry further comprises a second logic circuit, wherein the second logic circuit is accessible via the at least one second address and wherein the second logic circuit comprises at least one sensor which is readable by a print apparatus in which the replaceable print apparatus component is installed via the at least one second address.
49. Processing circuitry according to Statement 47 or 48 in which the at least one sensor which is readable by a print apparatus in which the replaceable print apparatus component is installed via the at least one second address is not readable via the first address.
50. Processing circuitry according to any of Statements 47 to 49 wherein the sensor comprises a consumable materials level sensor.

In some examples, the disclosure comprises any of the following Paragraphs

Paragraphs

1. A logic circuitry package having a first address and comprising a first logic circuit,
  wherein the first address is an I2C address for the first logic circuit, and wherein the package is configured such that, in response to a first command indicative of a task and a first time period sent to the first address, the first logic circuit is to, for a duration of the time period:
    (i) perform a task, and
    (ii) disregard I2C traffic sent to the first address.
2. The logic circuitry package of Paragraph 1 wherein the first logic circuit further comprises a timer to measure the time period.
3. A logic circuitry package according to Paragraph 2 wherein the task performed by the logic circuitry package comprises at least one of: monitoring the timer and performing a computational task having a completion time which exceeds the time period.
4. A logic circuitry package according to any preceding Paragraph wherein the package is for association with a print material container.
5. A logic circuitry package according to Paragraph 4 further comprising a memory storing data representative of at least one characteristic of the print material container.
6. A logic circuitry package according to any preceding Paragraph wherein the package comprises a second logic circuit and the package is configured to make the second logic circuit accessible during the time period.
7. A logic circuitry package according to Paragraph 6 wherein the package comprises a dedicated signal path between the first and second logic circuit and the second logic circuit is made accessible by the first logic circuit sending a signal via the dedicated signal path.
8. A logic circuitry package according to Paragraph 7 wherein the signal is present for the duration of the time period.
9. A logic circuitry package according to any preceding Paragraph which comprises at least one sensor or sensor array.
10. A logic circuitry package according to Paragraph 9 wherein the at least one sensor comprises at least one print material level sensor.
11. A logic circuitry package according to any preceding Paragraph wherein the package has at least one second address and is configured such that, in response to the first command, the package is accessible via a second address for the duration of the time period.
12. A logic circuitry package according to Paragraph 11 wherein the package is configured to provide a first set of responses in response to instructions sent to the first address and to provide a second set of responses in response to instructions sent to a second address.
13. A logic circuitry package according to Paragraph 11 or Paragraph 12 wherein the package is configured to operate in a first mode in response to instructions sent to the first address and to operate in a second mode in response to instructions sent to the second address.
14. A logic circuitry package according to any of Paragraphs 11 to 13 wherein the package is configured to provide a cryptographically authenticated set of responses in response to cryptographically authenticated communications sent to the first address and to provide a second, not cryptographically authenticated, set of responses in response to communications sent to the second address.
15. A logic circuitry package according to any of Paragraphs 11 to 14 which is configured to transmit, outside of said time period and in response to communications sent to the first address, print material level-related data that is authenticated using an encryption key, and which is further configured to transmit, during the time period and in response to communications sent to the second address, print material level-related data not authenticated using that key.
16. A logic circuitry package according to any of Paragraphs 11 to 15 wherein the at least one second address is an address of a second logic circuit.
17. A logic circuitry package according to any of Paragraphs 11 to 16 wherein the package is not accessible via the second address for a second time period preceding the first time period and/or for a third time period following the first time period.

18. A logic circuitry package according to any of Paragraphs 11 to 17 configured to set the second address to an initial second address at each start of the first time period.

19. A logic circuitry package according to Paragraph 18 wherein the package is configured to set its second address to a temporary address in response to a command sent to the initial second address, the command including that temporary address.

20. A logic circuitry package according to Paragraph 18 or 19, wherein, on receipt of a subsequent command indicative of a task and the first time period sent to the first address, the logic circuitry package is configured to have the same initial second address.

21. A logic circuitry package according to any of Paragraphs 11 to 20 which is configured to:
respond to commands directed to the first address and not to commands directed to the second address outside the first time period; and
respond to commands directed to the second address and not to commands directed to the first address during the first time period.

22. A plurality of logic circuitry packages according to any of Paragraphs 11 to 21 having different first addresses and the same second address.

23. A method comprising:
in response to a first command indicative of a task and a first time period sent to a first address of processing circuitry via an I2C bus
 (i) performing, by the processing circuitry, a task and
 (ii) disregarding I2C traffic sent to the first address
for a duration of the time period, the method comprising monitoring the time period using a timer of the processing circuitry.

24. A method according to Paragraph 23 wherein the method is carried out on processing circuitry provided on a replaceable print apparatus component.

25. A method according to any of Paragraphs 23 to 24, further comprising, for the duration of the time period, responding, by the processing circuitry, to I2C traffic sent to at least one second address of the processing circuitry.

26. A method according to Paragraph 25 wherein the first address is associated with a first logic circuit of the processing circuitry, and the at least one second address is associated with a second logic circuit of the processing circuitry.

27. A method according to Paragraph 25 or 26 further comprising disabling access to the processing circuitry via the at least one second address after the duration of the time period.

28. A method according to any of Paragraphs 25 to 27 wherein the second address is configured to be an initial second address at the start of the first time period.

29. A method according to Paragraph 28 wherein the processing circuitry is configured to reconfigure its second address to a temporary second address in response to a command sent to the initial second address and including that temporary address during the first time period.

30. A method according to Paragraph 29, wherein, on receipt of a subsequent command indicative of the task and the first time period sent to the first address, the logic circuitry is configured to have the same initial second address.

31. A method according to any of Paragraphs 23 to 30 wherein the processing circuitry comprises a first logic circuit and a second logic circuit of the processing circuitry, wherein the first logic circuit is to perform the task and to send an activation signal to the second logic circuit for the duration of the time period.

32. A method according to Paragraph 31 wherein the method further comprises deactivating the second logic circuit by ceasing the activation signal.

33. A method according to Paragraph 31 or 32 wherein the activation signal is sent via a dedicated signal path.

34. A method according to any of Paragraphs 23 to 33 wherein the task performed by the processing circuitry is the task indicated in the first command.

35. Processing circuitry for use with a replaceable print apparatus component to connect to a print apparatus logic circuit comprising:
a memory and first logic circuit to enable a read operation from the memory and perform processing tasks, the first logic circuit comprising a timer,
wherein the processing circuitry is accessible via an I2C bus of a print apparatus in which the replaceable print apparatus component is installed and is associated with a first address and at least one second address, and the first address is an I2C address for the first logic circuit, and
wherein the first logic circuit is to participate in authentication of the replaceable print apparatus component by a print apparatus in which the replaceable print apparatus component is installed; and
the processing circuitry is configured such that, in response to a first command indicative of a task and a first time period sent to the first logic circuit via the first address, the processing circuitry is to:
 (i) perform a task, and
 (ii) not respond to I2C traffic sent to the first address for a duration of the time period as measured by the timer.

36. Processing circuitry according to Paragraph 35 wherein the processing circuitry further comprises a second logic circuit, wherein the second logic circuit is accessible via the I2C bus and a second address, and the first logic circuit is to generate an activation signal to activate the second logic circuit for the duration of the time period.

37. Processing circuitry according to Paragraph 36 wherein the processing circuitry comprises a dedicated signal path between the first and second logic circuits for transmitting the activation signal.

38. Processing circuitry according to Paragraph 36 or 37 wherein the second logic circuit comprises at least one sensor which is readable by a print apparatus in which the replaceable print apparatus component is installed via the second address.

39. Processing circuitry according to any of Paragraphs 36 to 38 comprising at least one sensor which is readable by a print apparatus in which the replaceable print apparatus component is installed via the second address and which is not readable via the first address.

40. Processing circuitry according to Paragraph 38 or 39 wherein the sensor comprises a consumable materials level sensor.

41. A plurality of print components each comprising a memory, wherein the memories of different print component store different print liquid characteristics, and each print component comprises a logic circuitry package according to any of Paragraphs 1 to 21 or processing circuitry of Paragraphs 35 to 40.

42. A print cartridge comprising a logic circuitry package according to any of Paragraphs 1 to 21 and having a housing that has a width that is less than a height, wherein, in a front face, from bottom to top, a print liquid output, an air input and a recess are provided, respectively, the recess extending at the top, wherein I2C bus contacts of the package are provided at a side of the recess against an inner side of a side wall of the housing adjacent the top and front of the housing, and comprise a data contact, the data contact being the lowest of the I2C bus contacts.

43. A print cartridge according to Paragraph 42, wherein the first logic circuit of the package is also provided against the inner side of the side wall.

44. A replaceable print apparatus component including the logic circuitry package of any of Paragraphs 1 to 21, the component further comprising a volume of liquid, the component having a height that is greater than a width and a length that is greater than the height, the width extending between two sides, wherein the package comprises interface pads, and the interface pads are provided at an inner side of one of the sides facing a cut-out for a data interconnect to be inserted, the interface pads extending along a height direction near the top and front of the component, and a data pad is a bottom-most of the interface pads, the liquid and air interface of the component being provided at the front on the same vertical reference axis parallel to the height direction wherein the vertical axis is parallel to and distanced from the axis that intersects the interface pads.

45. A replaceable print apparatus component according to Paragraph 44 wherein the rest of the logic circuitry package is also provided against the inner side.

In some examples, the disclosure comprises any of the following Clauses:

Clauses

1. A logic circuitry package configured to be addressable via a first address and at least one second address and comprising a first logic circuit,
   wherein the first address is an address for the first logic circuit, wherein the package is configured such that:
   in response to a first command indicative of a first command time period sent to the first address, the package is accessible via at least one second address for a duration of the first command time period; and
   in response to a second command indicative of a second command time period sent to the first address, the first logic circuit is to, for a duration of the second command time period, disregard traffic sent to the first address.

2. A logic circuitry package according to Clause 1 wherein the first logic circuit comprises a timer wherein the first command time period and/or second command time period are measured by the timer.

3. A logic circuitry package of Clause 1 or Clause 2 wherein, in response to the second command the logic circuit is configured to perform a processing task during at least the first or second command time period.

4. A logic circuitry package according to Clause 3 wherein the processing task comprises at least one of: monitoring a timer and performing a computational task having a completion time which exceeds the first command time period and/or second command time period.

5. A logic circuitry package according to any preceding Clause wherein the second command time period is longer than the first command time period and the first logic circuit is to, in response to the second command, not respond to traffic sent to the first address for the duration of the second command time period.

6. A logic circuitry package according to any preceding Clause wherein the package is for association with a print material container.

7. A logic circuitry package according to Clause 6 further comprising a memory storing data representative of at least one characteristic of the print material container.

8. A logic circuitry package according to any preceding Clause wherein the package comprises a second logic circuit and the package is configured to make the second logic circuit accessible during the first command time period.

9. A logic circuitry package according to Clause 8 wherein the package comprises a dedicated signal path between the first and second logic circuit and the second logic circuit is made accessible by the first logic circuit sending a signal via the dedicated signal path.

10. A logic circuitry package according to Clause 9 wherein the signal is present for the duration of the first command time period.

11. A logic circuitry package according to any preceding Clause which comprises at least one sensor or at least one sensor array.

12. A logic circuitry package according to Clause 11 wherein the at least one sensor or at least one sensor array comprises at least one print material level sensor.

13. A logic circuitry package according to any preceding Clause wherein the package is configured such that, in response to the second command, the package is accessible via a second address for the duration of the second command time period.

14. A logic circuitry package according to Clause 13 wherein the package is configured to provide a first set of responses in response to instructions sent to the first address and to provide a second set of responses in response to instructions sent to a second address.

15. A logic circuitry package according to Clause 13 or 14 wherein the package is configured to operate in a first mode in response to instructions sent to the first address and to operate in a second mode in response to instructions sent to the first address.

16. A logic circuitry package according to any of Clauses 13 to 15 wherein the package is configured to provide a cryptographically authenticated set of responses in response to cryptographically authenticated instructions sent to the first address and to provide a second, not cryptographically, authenticated set of responses in response to instructions sent to the second address.

17. A logic circuitry package according to any of Clauses 13 to 16 wherein the second address is an address of the second logic circuit.

18. A logic circuitry package according to any of Clauses 13 to 17 wherein the package is not accessible via the second address for a time period preceding the first command time period and/or for a time period following the first command time period.

19. A logic circuitry package according to any of Clauses 13 to 18 wherein the second address is configured to be an initial second address at the start of the first command time period.

20. A logic circuitry package according to Clause 19 wherein the package is configured to reconfigure its second address to a temporary address in response to a command sent to the initial second address and including that temporary address during the first command time period.

21. A logic circuitry package according to Clause 19 or 20, wherein, on receipt of a subsequent command indicative of the first command time period sent to the first address, the logic circuitry package is configured to have the same initial second address.

22. A logic circuitry package according to any preceding Clause which is configured to:
respond to commands directed to the first address and not to commands directed to a second address outside the first command time period; and respond to commands directed to a second address and not to commands directed to the first address during the first command time period.

23. A plurality of logic circuitry packages according to any of Clauses 13 to 22 having different first addresses and the same second address.

24. A plurality of logic circuitry packages according to Clause 23 storing different data representative of at least one characteristic of different print material containers.

25. A method comprising:
in response to a first command indicative of a first command time period sent to a first address of processing circuitry via an I2C bus, enabling, by the processing circuitry, access thereto via at least one second address for a duration of the first command time period; and
in response to a second command indicative of a second command time period sent to the first address via the I2C bus, and for a duration of the second command time period, ignoring I2C traffic sent to the first address;
the method further comprising monitoring at least one of the first and second command time period using a timer of the processing circuitry.

26. A method according to Clause 25 wherein the method is carried out on processing circuitry provided on a replaceable print apparatus component.

27. A method according to Clause 25 or 26 wherein in response to the second command, the processing circuitry is to perform a task.

28. A method according to Clause 27 wherein the task is a task indicated in the second command.

29. A method according to any of Clauses 25 to 28, further comprising, for the duration of the first command time period, responding, by the processing circuitry, to I2C traffic sent to the at least one second address of the processing circuitry.

30. A method according to Clause 29 wherein the first address is associated with a first logic circuit of the processing circuitry, and the at least one second address is associated with a second logic circuit of the processing circuitry.

31. A method according to Clause 30 further comprising disabling access to the processing circuitry via the at least one second address after the duration of the first command time period.

32. A method according to any of Clauses 25 to 31 wherein the second address is configured to be an initial second address at the start of the first command time period.

33. A method according to Clause 32 wherein the processing circuitry is configured to reconfigure its second address to a temporary address in response to a command sent to the initial second address and including that temporary address during the first command time period.

34. A method according to Clause 33, wherein, on receipt of a subsequent command indicative of the first command time period sent to the first address, the processing circuitry is configured to have the same initial second address.

35. A method according to any of Clauses 25 to 34 wherein the processing circuitry comprises a first logic circuit and a second logic circuit of the processing circuitry, wherein the method comprises, sending, by the first logic circuit, an activation signal to the second logic circuit for the duration of the first command time period.

36. A method according to Clause 35 wherein the method further comprises deactivating the second logic circuit by ceasing the activation signal.

37. A method according to Clause 35 or 36 comprising sending the activation signal via a dedicated signal path.

38. Processing circuitry for use with a replaceable print apparatus component comprising:
a memory and first logic circuit to enable a read operation from the memory and perform processing tasks, the first logic circuit comprising a timer,
wherein the processing circuitry is accessible via an I2C bus of a print apparatus in which the replaceable print apparatus component is installed and is associated with a first address and at least one second address, and the first address is an I2C address for the first logic circuit, and
wherein the first logic circuit is to participate in authentication of the replaceable print apparatus component by a print apparatus in which the replaceable print apparatus component is installed; and
wherein the circuitry is configured such that:
in response to a first command indicative of a first command time period sent to the first address, the processing circuit is accessible via at least one second address for a duration of the first command time period; and
in response to a second command indicative of a second command time period sent to the first address, the first logic circuit is to, for a duration of the second command time period as measured by the timer, ignore I2C traffic sent to the first address.

39. Processing circuitry according to Clause 38 wherein the first logic circuit is configured to be accessible via the at least one second address for the duration of the first command time period.

40. Processing circuitry according to Clause 39 wherein the processing circuitry further comprises a second logic circuit, wherein the second logic circuit is accessible via the I2C bus and a second address, and the first logic circuit is to generate an activation signal to activate the second logic circuit for the duration of the first command time period.

41. Processing circuitry according to Clause 40 wherein the processing circuitry comprises a dedicated signal path between the first and second logic circuits for transmitting the activation signal.

42. Processing circuitry according to Clause 39 or 41 wherein the second logic circuit comprises at least one sensor or sensor array which is readable by a print apparatus in which the replaceable print apparatus component is installed via the at least one second address.

43. Processing circuitry according to Clause 42 in which the at least one sensor or sensor array which is readable by a print apparatus in which the replaceable print apparatus component is installed via the at least one second address is not readable via the first address.

44. Processing circuitry according to any of Clauses 42 or 43 wherein the sensor comprises a consumable materials level sensor.

45. Processing circuitry according to any of Clauses 42 to 44 where, in response to the first command the processing circuitry is to, for a duration of the first command time period as measured by the timer, ignore I2C traffic sent to the first address; and/or in response to the second command, the processing circuit is accessible via at least one second address for a duration of the first command time period.

46. A plurality of print components each comprising a memory wherein the memories of different print components store different print liquid characteristics, and each print component comprises a logic circuitry package according to any of Clauses 1 to 22.

47. A print cartridge comprising a logic circuitry package according to any of Clauses 1 to 22 and having a housing that has a width that is less than a height, wherein, in a front face, from bottom to top, a print liquid output, an air input and a recess are provided, respectively, the recess extending at the top, wherein I2C bus contacts of the package are provided at a side of the recess against an inner side of a side wall of the housing adjacent the top and front of the housing, the I2C bus contacts comprising a data contact, the data contact being the lowest of the contacts.

48. A print cartridge according to Clause 47, wherein the first logic circuit of the package is also provided against the inner side of the side wall.

49. A replaceable print apparatus component including the logic circuitry package of any of Clauses 1 to 22, the component further comprising a volume of liquid, the component having a height that is greater than a width and a length that is greater than the height, the width extending between two sides, the package comprising interface pads, wherein the interface pads are provided at an inner side of one of the sides facing a cut-out for a data interconnect to be inserted, the interface pads extending along a height direction near the top and front of the component, and comprising a data pad, the data pad being the bottom-most of the interface pads, the liquid and air interface of the component being provided at the front on the same vertical reference axis parallel to the height direction wherein the vertical axis is parallel to and distanced from the axis that intersects the interface pads.

50. A replaceable print apparatus component according to Clause 49 wherein the rest of the logic circuitry package is also provided against the inner side.

In some examples, the disclosure comprises any of the following Descriptions:

Descriptions

1. A logic circuit comprising:
a communications interface including a data contact to communicate via a communications bus;
an enablement contact, separate from the communication interface, to receive an input to enable the logic circuit; and
at least one memory register, comprising at least one reconfigurable address register,
wherein the logic circuit is configured, such that, when enabled, it responds to communications sent via the communication bus which are addressed to the address held in a reconfigurable address register.

2. A logic circuit according to Description 1 comprising:
an analogue to digital converter.

3. A logic circuit according to Description 2 further comprising at least one memory register to store an offset parameter and/or a gain parameter for the analogue to digital converter.

4. A logic circuit according to any preceding Description wherein the logic circuit comprises at least one sensor.

5. A logic circuit according to Description 4 wherein the at least one sensor comprises at least one liquid level sensor.

6. A logic circuit according to Description 4 or Description 5 wherein the at least one sensor comprises a first sensor array and a second sensor array, wherein the first and second sensor arrays comprise sensors of different types.

7. A logic circuit according to any of Descriptions 4 to 6 wherein the at least one sensor comprises at least one of an ambient temperatures sensor, a crack detector and a fluid temperature sensor.

8. A logic circuit according to any of Descriptions 4 to 6 comprising at least one of:
at least one memory register to store a sensor identifier;
at least one memory register to store a sensor reading; and
at least one memory register to store a number of sensors.

9. A logic circuit according to any of Descriptions 4-8 wherein the at least one sensor is provided on a substrate and the substrate and/or sensor have a length:width aspect ratio, as measured along the substrate surface, of at least 20:1.

10. A logic circuit according to any preceding Description wherein the logic circuit has a width and/or thickness of less than 1 mm.

11. A logic circuit according to any preceding Description comprising at least one memory register to store a version identity.

12. A logic circuit according to any preceding Description comprising a timer.

13. A logic circuit according to Description 12 in which the timer comprises a ring oscillator.

14. A logic circuit according to Description 12 or 13 comprising at least one memory to store a count of clock cycles.

15. A logic circuit according to any of the preceding Descriptions comprising a memory to store a value indicative of a read/write history of the logic circuit.

16. A logic circuit according to any preceding Description comprising logic configured to determine a value indicative of a read/write history of the logic circuit using a predetermined algorithmic function and/or based on predetermined secret data.

17. A logic circuit according to any preceding Description comprising logic configured to determine a plurality of values indicative of a read/write history of the logic circuit using different predetermined algorithmic function and/or based on predetermined secret data.

18. A logic circuit according to any preceding Description wherein the interface is an I2C interface.

19. A logic circuit according to any preceding Description wherein the logic circuit is for association with a print material container.

20. A replaceable print apparatus component including the logic circuit of any preceding Description, the component further comprising a volume of liquid, the component having a height that is greater than a width and a length that is greater than the height, the width extending between two sides, wherein the logic circuit comprises interface pads, and the interface pads are provided at an inner side of one of the sides facing a cut-out for a data interconnect to be inserted, the interface pads extending along a height direction near the top and front of the component, and the interface pads comprise a data pad, the data pad being the bottom-most of the interface pads, the liquid and air interface of the component being provided at the front on the same vertical reference axis parallel to the height direction wherein the vertical axis is parallel to and distanced from the axis that intersects the interface pads.

21. A replaceable print apparatus component according to Description 20 wherein the rest of the logic circuit is also provided against the inner side.

22. A logic circuit package comprising a first logic circuit and a second logic circuit, wherein the first logic circuit is configured to respond to communications sent to a first address and the second logic circuit comprises a logic circuit according to any of Descriptions 1 to 19.

23. A method comprising
receiving, by logic circuitry connected to an I2C bus, an enablement signal, wherein the enablement signal is provided at an input which is separate to the I2C bus,
setting, by the logic circuitry, an address thereof by writing a default address to an address memory register;
receiving, by the logic circuitry, a command addressed to the default address and comprising a request to reset the address;

setting, by the logic circuitry, a temporary address thereof by overwriting the default address in the address memory register; and receiving, by the logic circuitry, a command addressed to the temporary address.

24. A method according to Description 23 comprising receiving, by the logic circuitry, a validation request addressed to the temporary address, the validation request comprising a request for an indication of a clock speed of a timer of the logic circuitry; and determining, by the logic circuitry, a clock speed of the logic circuitry relative to another measurable clock signal or cycle and determining a validation response based on the relative clock speed.

25. A method according to Description 23 or 24 comprising receiving, by the logic circuitry, a validation request addressed to the second address, the validation request comprising a request for an indication of version identity; and determining, by the logic circuitry, a validation response by reading a memory of the logic circuitry to provide an indication of version identity.

26. A method according to any of Descriptions 23 to 25 comprising receiving, by the logic circuitry, a validation request addressed to the second address, the validation request comprising a request for an indication of version identity; and determining, by the logic circuitry, a validation response by testing at least one component of the logic circuitry to return a test result.

The invention claimed is:

1. A logic circuitry package for a replaceable print apparatus component, the logic circuitry package comprising:
    logic circuitry that is addressable via a first address and a second, reconfigurable address,
        the second, reconfigurable address being reconfigurable between a default address and at least one different address,
        the logic circuitry including print apparatus component characteristics data and a first key for cryptographic authentication of data being communicated, wherein the first key is related to a second key for cryptographic authentication stored on the print apparatus;
    wherein the logic circuitry package is to:
        participate in a first validation process based on communications sent to the first address by sending a cryptographically authenticated response that includes the characteristics data encrypted using the first key and at least one of a message authentication code or a session key identifier derived from at least one of the first key or the second key; and
        participate in a second validation process based on communications sent to the second address by sending validation responses including a bitstream that is not encrypted using the first key and not accompanied by a message authentication code or session key identifier;
    wherein the logic circuitry package is I2C compatible using I2C compatible addresses; and
    wherein, in response to a first command indicative of a task and a first time period sent to the first address, the logic circuitry package is accessible via at least one second address for a duration based on the time period.

2. A logic circuitry package according to claim 1, wherein the package includes a memory including identification data to be read via the second address.

3. A logic circuitry package according to claim 2, wherein the same identification data is stored in the package so as to be read by cryptographically authenticated communications via the first address.

4. A logic circuitry package according to claim 1, wherein the package includes a memory including a read/write history data portion to be read via the second address.

5. A logic circuitry package according to claim 4, wherein the memory further includes at least one cell count.

6. A logic circuitry package according to claim 5, wherein the at least one cell count is to be read via the second address.

7. A logic circuitry package according to claim 6, wherein the same at least one cell count data is to be read by cryptographically authenticated communications via the first address.

8. A logic circuitry package according to claim 6, further including at least one cell or array of cells the number of which corresponds to the stored cell count.

9. A logic circuitry package according to claim 5, wherein the package includes a first logic circuit associated with the first address and a second logic circuit associated with the reconfigurable address.

10. A logic circuitry package according to claim 9, wherein the first logic circuit is to selectively enable the second logic circuit.

11. A logic circuitry package according to claim 1, wherein the memory further stores a clock count.

12. A logic circuitry package according to claim 11, wherein the clock count represents a relative or absolute clock speed of a timer of the package.

13. A logic circuitry package according to claim 1, wherein the logic circuitry package is to:
    in response to a first cryptographically authenticated validation request to the first address, provide a cryptographically authenticated response using the first key,
    in response to a command including a time period, be responsive to commands directed to a default second address,
    in response to a command directed to a default second address, the command including a new address, reconfigure the default second address to be the new address,
    in response to a second validation request to the, reconfigured, new address, provide a response that is not cryptographically authenticated using the first key, and
    after the end of a duration based on the time period, again respond to commands directed to the first address.

14. A logic circuitry package according to claim 13 which is to reset the second address to the same default address before or at each command including the time period.

15. A logic circuitry package according to claim 14, further including a first and a second logic circuit associated with the first and second address, respectively, the logic circuitry package is to:
    enable the second logic circuit in response to the command including the time period, and
    set the initial second address at set enabling.

16. A logic circuitry package according to claim 13, wherein the package includes:
    a first operational mode in which the package responds to communication sent to the first address and not the second address, and
    a second operational mode in which the package responds to communications sent to the reconfigurable address and not the first address.

17. A logic circuitry package according to claim 13, wherein on receipt of a subsequent command indicative of a period sent to the first address, the logic circuitry package is to have the same default second address.

18. A logic circuitry package according to claim 1, wherein the first validation response includes identification data, the package includes a second logic circuit, and the identification data pertains to the second logic circuit.

19. A logic circuitry package according to claim 1, wherein the first validation response includes identification data and the second validation response includes the same identification data.

20. A logic circuitry package according to claim 1, further including a timer to measure the time period.

21. A logic circuitry package according to claim 20, further including a second timer to indicate a clock speed of the logic circuitry during the time period.

22. A print cartridge comprising:
the logic circuitry package according to claim 1; and
a housing that has a width that is less than a height, wherein, in a front face, from bottom to top, a print liquid output, an air input and a recess are provided, respectively, the recess extending at the top, the package comprising I2C bus contacts, wherein the I2C bus contacts are provided at a side of the recess against an inner side of a side wall of the housing adjacent the top and front of the housing, and the I2C bus contacts include a data contact, the data contact being the lowest of the I2C bus contacts.

23. A print cartridge according to claim 22, wherein the logic circuit of the package is provided against the inner side of the side wall.

24. A logic circuitry package according to claim 1, wherein the logic circuitry package includes at least one readable sensor and is to provide sensor data in response to a request sent to the second address.

25. A print cartridge comprising:
a logic circuitry package including:
at least one logic circuit that is addressable via a first address and via a second, reconfigurable address, the second, reconfigurable address being reconfigurable between a default address and at least one different address; and
print apparatus component characteristics data and a first key for cryptographic authentication of data being communicated, the first key related to a second key for cryptographic authentication stored on a print apparatus,
wherein the logic circuitry package is to:
participate in a first validation process based on communications sent to the first address by sending a cryptographically authenticated response that includes the characteristics data encrypted using the first key and at least one of a message authentication code or a session key identifier derived from at least one of the first key or the second key, and
participate in a second validation process based on communications sent to the second address by sending validation responses including a bitstream that is not encrypted using the first key and not accompanied by a message authentication code or session key identifier,
wherein the logic circuitry package is I2C compatible using I2C compatible addresses,
wherein, in response to a first command indicative of a task and a first time period sent to the first address, the logic circuitry package is accessible via at least one second address for a duration based on the time period, and
wherein the logic circuitry package is to provide sensor data in response to a request sent to the second address.

26. The print cartridge of claim 25 wherein the logic circuitry package includes a timer to determine the end of the duration based on the timer period.

27. The print cartridge of claim 25 wherein the logic circuitry package includes at least one sensor, the at least one logic circuit to test the at least one sensor in the second validation process.

28. A print cartridge according to claim 25, further including a housing that has a width that is less than a height, wherein, in a front face, from bottom to top, a print liquid output, an air input and a recess are provided, respectively, the recess extending at the top, the package comprising I2C bus contacts, wherein the I2C bus contacts are provided at a side of the recess against an inner side of a side wall of the housing adjacent the top and front of the housing, and the I2C bus contacts include a data contact, the data contact being the lowest of the I2C bus contacts.

29. A print cartridge according to claim 25, wherein the logic circuit of the package is provided against the inner side of the side wall.

* * * * *